(12) United States Patent
Stevens

(10) Patent No.: US 6,463,952 B1
(45) Date of Patent: Oct. 15, 2002

(54) LIQUID TRANSFER APPARATUS AND ADAPTORS

(75) Inventor: Alec Martin Stevens, Cleveland (AU)

(73) Assignee: Stevens Nominees (QLD) Pty Ltd, Queensland (AU)

( * ) Notice: Subject to any disclaimer, the term of this patent is extended or adjusted under 35 U.S.C. 154(b) by 0 days.

(21) Appl. No.: 09/806,977

(22) PCT Filed: Oct. 11, 1999

(86) PCT No.: PCT/AU99/00868

§ 371 (c)(1),
(2), (4) Date: Apr. 4, 2001

(87) PCT Pub. No.: WO00/21876

PCT Pub. Date: Apr. 20, 2000

(30) Foreign Application Priority Data

Oct. 12, 1998 (AU) .............................................. 6463/98
Apr. 16, 1999 (AU) .............................................. 9799/99
Jun. 1, 1999 (AU) .............................................. 0740/99

(51) Int. Cl.[7] .................................................. F04F 1/06
(52) U.S. Cl. ........................ 137/205; 222/109; 222/152
(58) Field of Search ........................... 137/205; 222/109, 222/152

(56) References Cited

U.S. PATENT DOCUMENTS

| | | | |
|---|---|---|---|
| 4,172,606 A | 10/1979 | Howe | 285/34 |
| 5,002,154 A | * 3/1991 | Chen | 184/1.5 |
| 5,324,150 A | 6/1994 | Fullerton | 411/433 |
| 5,450,924 A | * 9/1995 | Tseng | 184/1.5 |
| 5,464,397 A | 11/1995 | Powers, Jr. | 604/246 |
| 5,613,816 A | 3/1997 | Cabahug | 411/433 |
| 5,626,174 A | 5/1997 | Schaffner | |

FOREIGN PATENT DOCUMENTS

| | | |
|---|---|---|
| EP | 306126 | 8/1989 |
| FR | 2488583 | 2/1982 |
| GB | 2193904 | 2/1988 |
| GB | 2270725 | 3/1994 |
| GB | 2304845 | 3/1997 |
| SE | 464569 | 8/1991 |
| WO | WO88/06252 | 8/1988 |
| WO | WO96/19407 | 6/1996 |
| WO | WO98/15743 | 4/1998 |

* cited by examiner

*Primary Examiner*—Gerald A. Michalsky
(74) *Attorney, Agent, or Firm*—Abelman, Frayne & Schwab

(57) ABSTRACT

Liquid transfer apparatus transfers liquid between containers, and includes a liquid storage chamber having an inlet and an outlet; a pump chamber having an inlet and an outlet; a passage connecting the storage chamber outlet to the pump chamber inlet; a suction pump mechanism for sucking air from the storage chamber via the pump chamber inlet; and a valve for selectively opening and closing the inlet of the liquid storage chamber, allowing liquid to flow into the storage chamber upon suction being applied to the storage chamber by a pump and opening of the inlet. A carry case stores the liquid transfer apparatus and three different adaptors, which can be connected to an aperture of a container for use with a liquid transfer apparatus. One adaptor has a radially adjustable thread engaging components to enable the adaptor to be connected to different sized apertures.

10 Claims, 24 Drawing Sheets

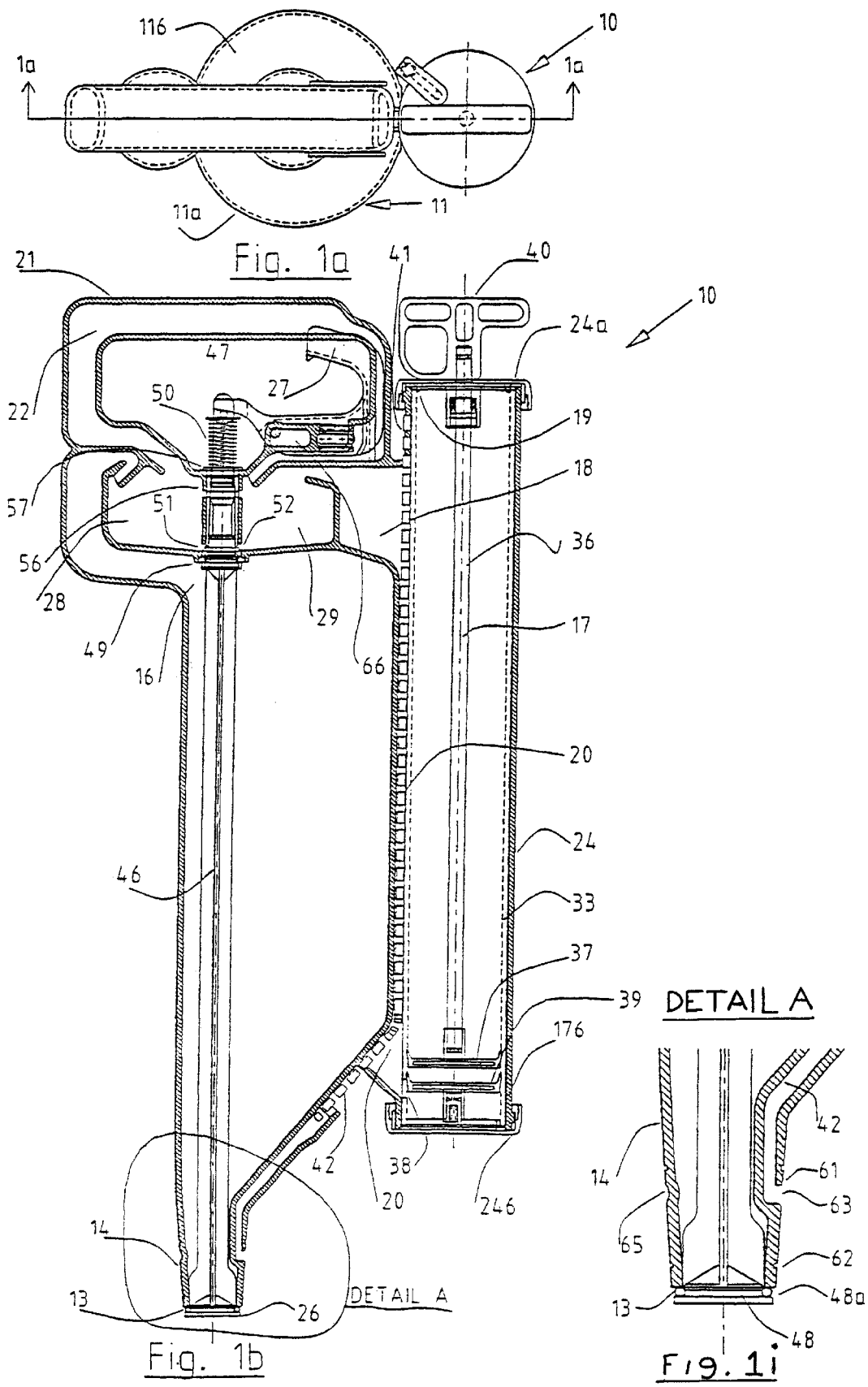

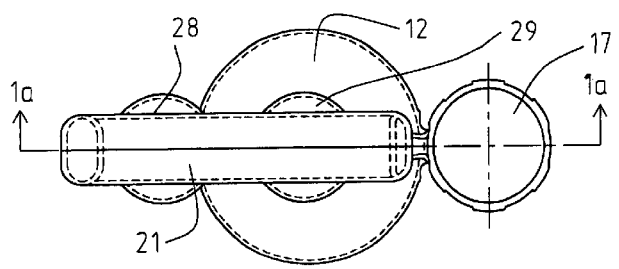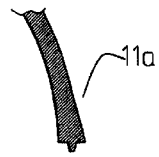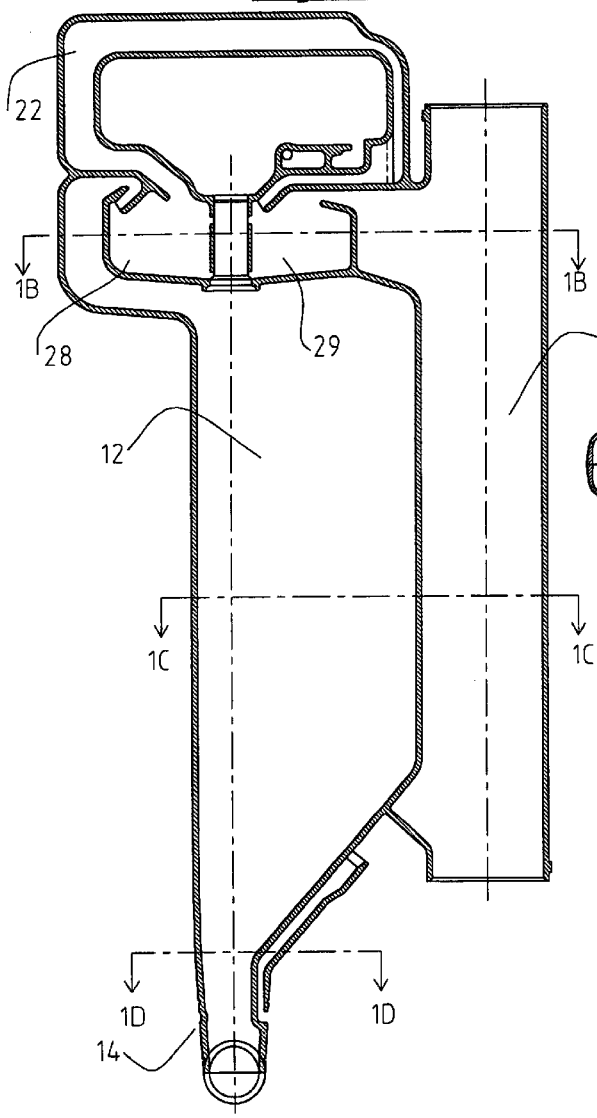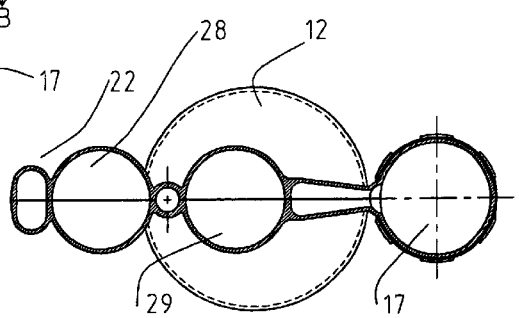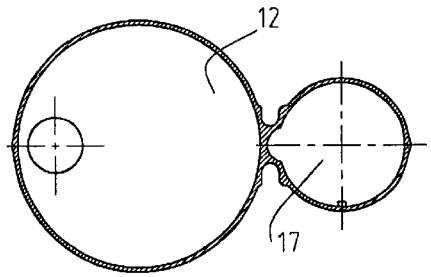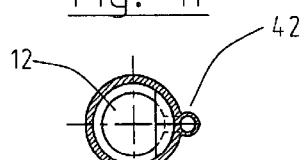

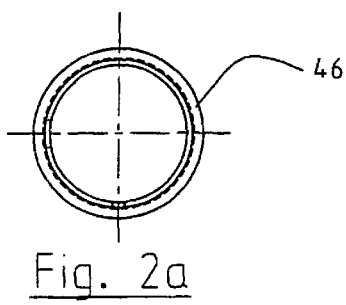
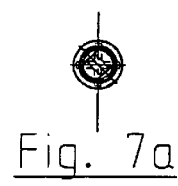
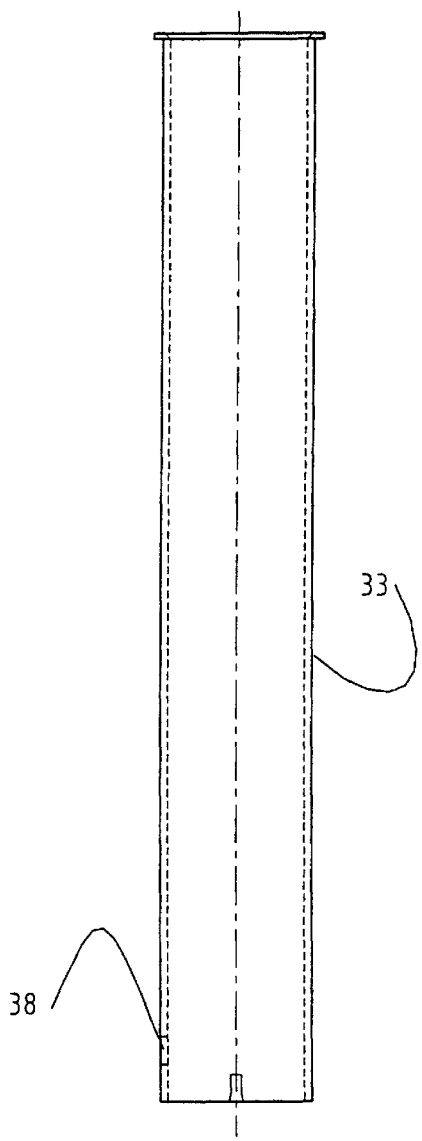
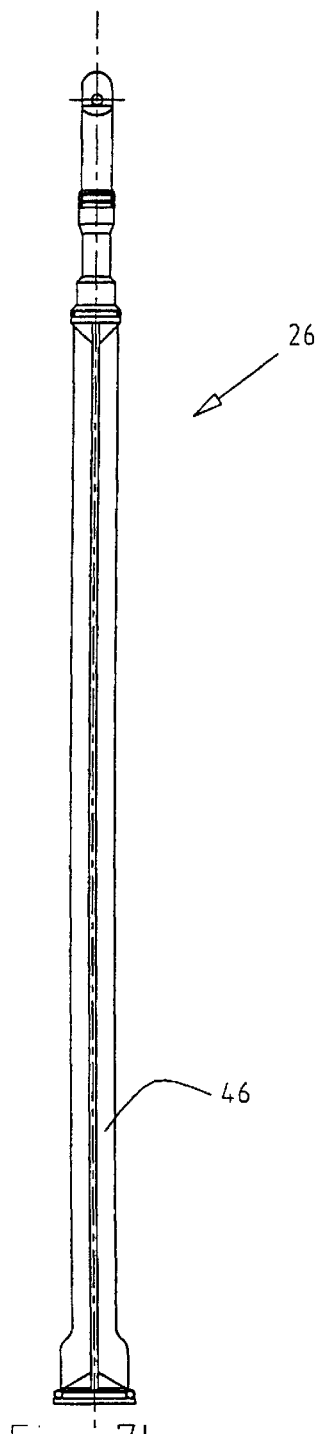

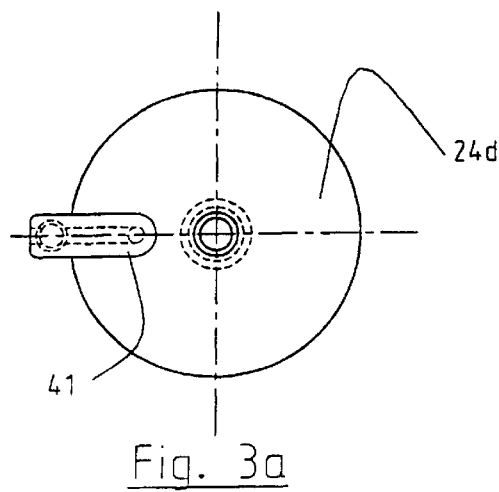
Fig. 3a
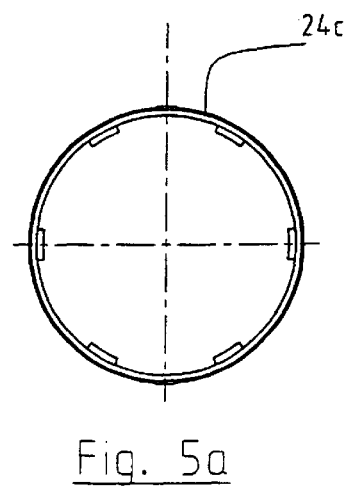
Fig. 5a
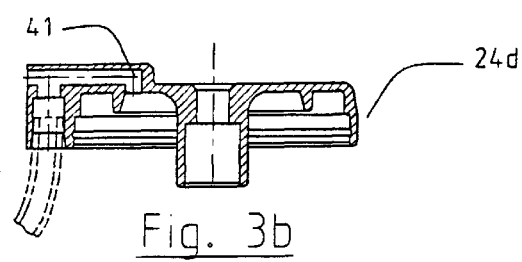
Fig. 3b
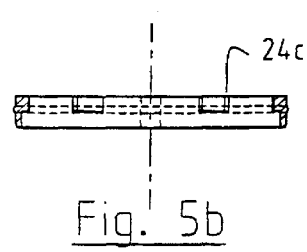
Fig. 5b
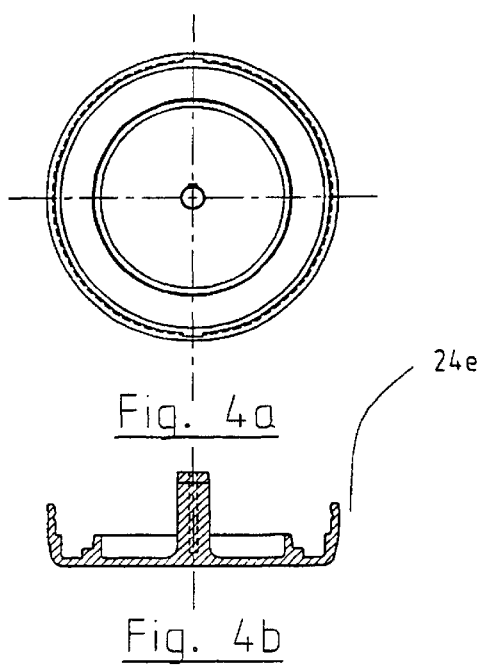
Fig. 4a
Fig. 4b
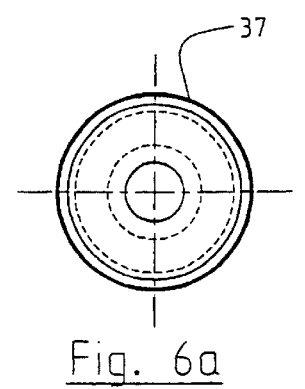
Fig. 6a
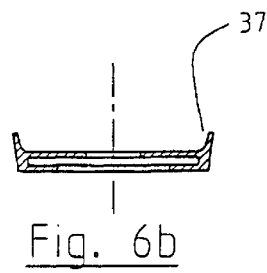
Fig. 6b

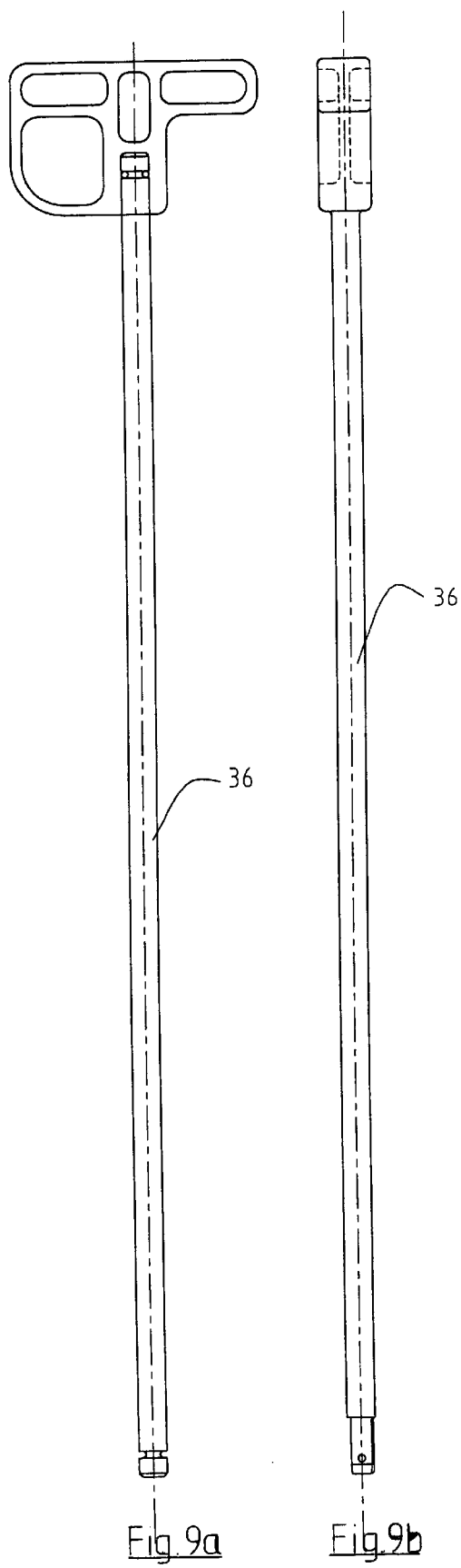
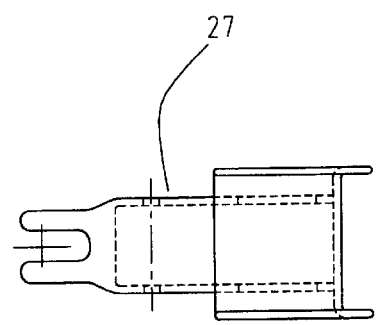
Fig. 8a
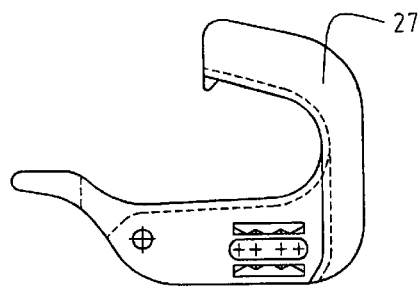
Fig. 8b
Fig. 9a    Fig. 9b

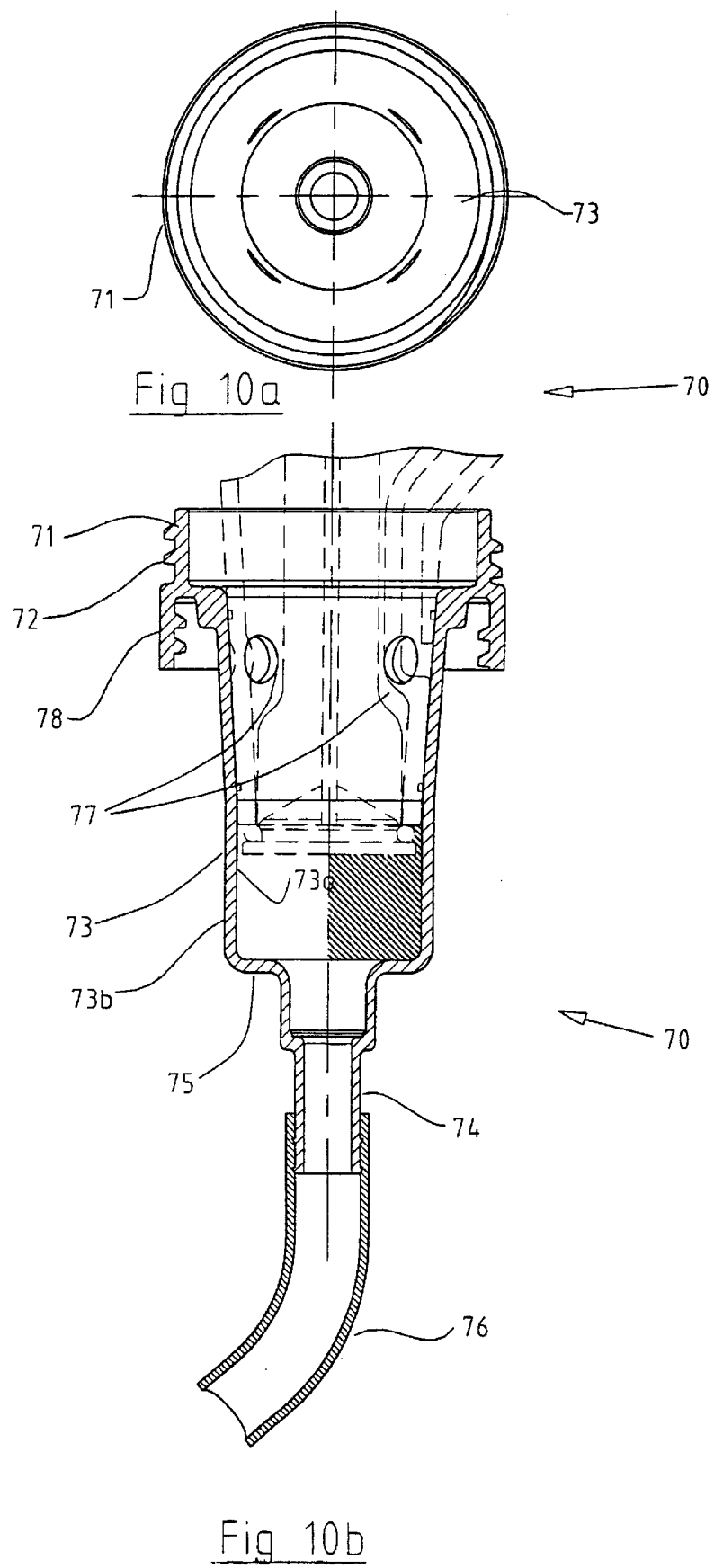

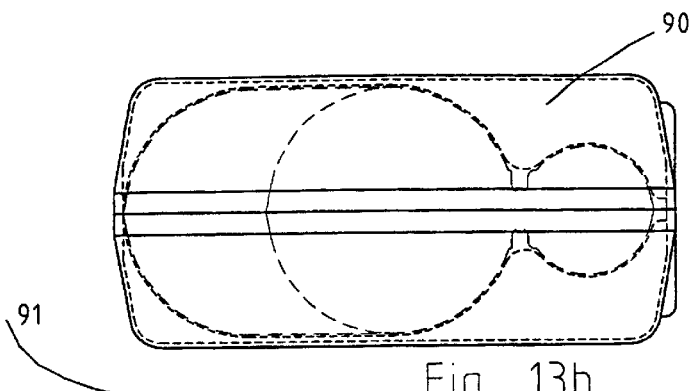
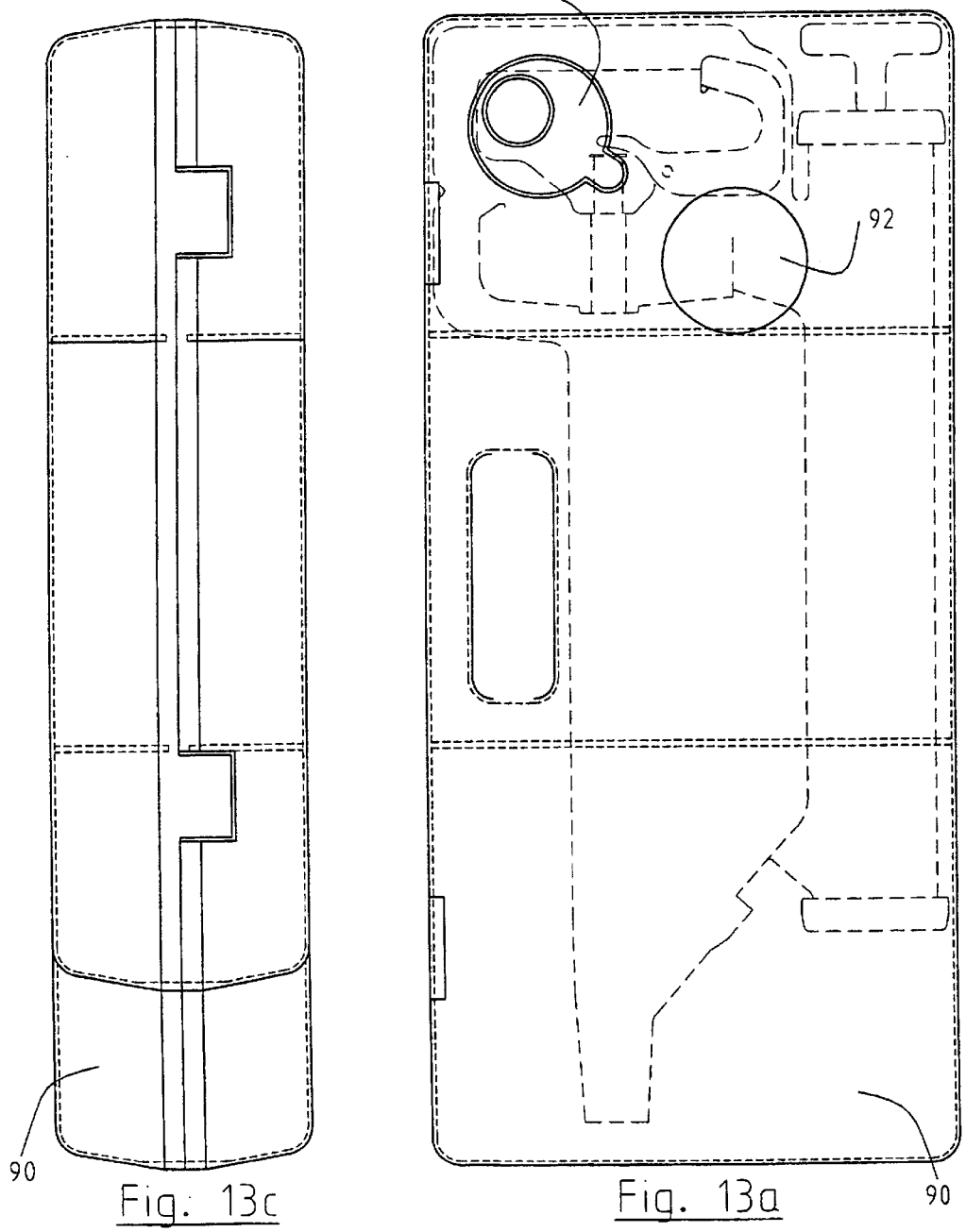

DETAIL B

DETAIL B

LIQUID TRANSFER APPARATUS AND ADAPTORS

FIELD OF THE INVENTION

This invention relates to liquid transfer apparatus and adaptors for liquid transfer apparatus.

The invention has particular application to liquid transfer apparatus and adaptors for transferring hazardous chemical liquids but it also has application to the transfer of safe liquids where accurate measurement is required.

There are many instances in which hazardous chemicals need to be transferred from one container to another, for example, when mixing poisons such as weedicides or pesticides with water. Typically, an operator pours the poison into a measuring container and then pours the measured amount into the applicator, whether it be a manually operated applicator or a motor driven or tractor drawn applicator.

BACKGROUND ART

International patent application No. PCT/AU95/00869 describes apparatus for and a method of transferring hazardous liquids from one container to another utilising a suction pump assembly with bubble extraction chambers and a transfer vessel interposed between the bubble extraction chambers and the container of poison and arranged so that a desired amount of poison may flow into the transfer vessel once suction is applied without entering the pump assembly and then be transferred to an applicator or other container as required. Whilst this system works quite effectively in commercial operations, it is not as compact as is desirable and additionally the pump assembly is expensive to manufacture. Furthermore, the system does not lend itself to easy portability, transport or safe storage.

One object of the present invention is to provide liquid transfer apparatus for use in transferring hazardous liquids which is relatively inexpensive to manufacture. Another object is to provide liquid transfer apparatus which lends itself to easy portability and can be used by home handymen as well as commercial operators. It is another object to provide liquid transfer apparatus which includes means for accurately measuring quantities of liquid being transferred. Another object is to provide liquid transfer apparatus which can operate in conjunction with a container of liquid chemical in a closed system. It is yet another object to provide liquid transfer apparatus which can be easily dismantled for cleaning purposes. It is still yet another object to provide a system of transferring hazardous liquids which reduces the likelihood of spillage including complementary components in conjunction with liquid transfer apparatus.

DISCLOSURE OF THE INVENTION

With the foregoing in view, this invention in one aspect resides broadly in liquid transfer apparatus for transferring liquid from one container to another container including:

a body defining an elongate liquid storage chamber having a liquid inlet at one end and a fluid outlet spaced longitudinally from said liquid inlet, a pump chamber having a fluid inlet and a fluid outlet, a fluid flow passage connecting said elongate liquid storage chamber and said pump chamber via said fluid outlet of said elongate storage chamber and said fluid inlet of said pump chamber, and a handle, said body being formed of two halves joined together, each half defining part of said elongate storage chamber and part of said pump chamber and being constructed substantially of a thermoplastics material;

pump means mounted in said pump chamber for sucking air from said storage chamber via said pump chamber fluid inlet, and valve means for selectively opening and closing said liquid inlet whereby liquid may be allowed to flow into said elongate storage chamber upon suction being applied to said elongate liquid storage chamber by said pump means and opening of said liquid inlet. Preferably, said handle includes a passage therethrough which forms at least part of said fluid flow passage and each half defines half of said handle and said passage. It is to be understood that the term "half" and its derivatives as used herein unless clearly not appropriate is intended to encompass complementary parts which when joined together form the body or a component of the body as described but which may not be actual mathematical halves. Furthermore, terms such as upright, upper and lower, top and bottom and the like are used for the purpose of description and illustration of the invention in the position it would normally be used for extracting liquid from one container, but it is to be understood that these terms do not limit the use of the invention to this position.

In another aspect this invention resides broadly in liquid transfer apparatus for transferring liquid from one container to another container including:

a body defining an elongate liquid storage chamber having a liquid inlet at one end in a spigot portion of said body for receiving liquid from the one container and for discharging liquid to the other container, and a fluid outlet spaced longitudinally from said liquid inlet, a pump chamber having a fluid inlet and a fluid outlet, a fluid flow passage connecting said elongate liquid storage chamber and said pump chamber via said fluid outlet of said elongate storage chamber and said fluid inlet of said pump chamber, and a handle, said spigot portion being adapted to sealingly cooperate with a complementary socket provided in the one container;

suction pump means mounted in said pump chamber for sucking air from said storage chamber via said pump chamber fluid inlet, and valve means for selectively opening and closing said liquid inlet whereby liquid may be allowed to flow into said elongate storage chamber upon suction being applied to said elongate liquid storage chamber by said pump means and opening of said liquid inlet.

Preferably, said fluid flow passage includes one or more liquid collection chambers therein for collecting liquid from moist air flowing therethrough, said one or more liquid extraction chambers being arranged so that liquid from moisture laden air flowing through said fluid flow passage may collect therein.

Preferably, said valve is controlled by a trigger mounted adjacent said handle.

Preferably, the apparatus includes a conduit connected to said pump chamber fluid outlet for allowing fluid sucked from said elongate storage chamber to flow to the one container thereby allowing the apparatus and the container to form a closed system for transfer from the container to the storage chamber so that air or fluid sucked from the storage chamber is discharged into the container as liquid is removed. It is also preferred that the conduit open adjacent said spigot portion and be adapted to cooperate with the complementary socket provided on the one container to allow the fluid to flow into the one container as liquid is removed.

In another aspect the invention resides broadly in an adaptor for fitting to an opening of a container and adapted to co-operate with a spigot portion or other part of a pump or other liquid transfer apparatus for filling the apparatus with liquid from the container, the adaptor including:

a socket portion having an entry adapted to receive therethrough the spigot portion(or other liquid entry part) of the liquid transfer apparatus for sealing engagement of the spigot portion in said socket portion;

securing means on said socket portion or operatively connected to said socket portion for securing said socket portion to the container for liquid communication of the socket portion with the container via the container opening;

a liquid inlet in said socket portion for allowing liquid to flow into said socket portion from the container, the parts being so made and arranged that liquid may flow from said socket portion to the liquid transfer apparatus through the spigot portion (or other liquid entry part) upon vacuum being thereto applied, the diameter of said entry being greater than the diameter of the opening of the container.

Preferably, the socket portion has a fluid outlet spaced from the fluid inlet which is connected to a conduit or other flow passage through which fluid can flow into the container. Suitably, the fluid outlet is adapted for sealed fluid communication with a complementary fluid outlet on the pump or other liquid transfer apparatus with which the adaptor is to be used whereby air, vapour or other fluid expelled from the pump can flow through the fluid outlet and into the container thereby allowing the pump and the container to form a closed system during transfer of liquid from the container to the pump. Preferably the fluid flow passage opens within the bounds of the securing means so that fluid flowing therethrough will flow into the container via the container opening.

Preferably, the adaptor is constituted by two main components with the socket portion being formed in one component which is fitted within the other component with a space formed therebetween providing the flow passage for fluid flow from the fluid outlet to the container mentioned previously. Suitably, in such form, the securing means is provided on the other component and preferably is a threaded portion adapted to engage a complementary threaded portion on the container. It is also preferred that the adaptor include a threaded closure or other suitable alternative for closing the entry to the socket portion and that the one component include a complementary threaded portion or equivalent for cooperating with the closure. Advantageously, such arrangement allows the adaptor to remain connected to the container while still being able to be closed.

Preferably the adaptor includes residue limiting means mounted in the socket portion and adapted to co-operate with the spigot portion of a pump engaged in the socket portion so as to restrict the amount of surface area of the spigot portion which is contacted by liquid flowing from the container to the pump. Preferably the residue limiting means includes a plate-like component adapted to engage with the end face of the spigot portion to form a cover thereon.

In another aspect this invention resides broadly in an adaptor for a container for adapting an opening of the container to receive the spigot portion of liquid transfer apparatus as previously described, the adaptor including:

a wall defining a socket portion adapted to receive the spigot of the liquid transfer apparatus, an inlet in said wall for allowing liquid to flow into said socket portion and an outlet in said wall for allowing fluid to flow from said socket portion into the container, said fluid outlet being spaced from said inlet and the inner face of said wall being-adapted to sealingly engage with spaced apart sealing means on the spigot on each side of said outlet to isolate said outlet from said inlet, and securing means on said socket portion or operatively connected to said socket portion for securing said socket portion to the container for liquid communication of the socket portion with the container.

In another aspect the invention resides broadly in an adaptor for fitting to a threaded opening of a container and adapted to co-operate with another product for the transfer of liquid from the container to or via the other product, the adaptor including;

a cap portion adapted to engage with the rim of the container opening;

a plurality of circumferentially spaced apart thread engaging components moveably connected to and depending from said cap portion and adapted to engage with respective circumferentially spaced portions of the thread about the opening, and adjustment means operatively connected to said thread engaging components and adapted to adjust the position of said thread engaging components radially in and out for engagement with openings of different size.

It will be seen that the adaptor may be fitted to a plurality of different sized and/or different types of threaded container openings and adapted to co-operate with a desired complementary product. The adaptor has particular application for fitting to plastic four litre and twenty litre containers which at present are produced with a multitude of different sized openings and different types of threads. In many cases, the differences in opening size and type of thread is immaterial because the contents are simply poured from the container into another receptacle, for example from a four litre plastic oil container into an engine. However, the transfer of hazardous liquids from one container to another container or other receptacle must be undertaken with great care so that spillage is avoided. Additionally, in many cases great care must also be taken so that the desired amount of hazardous liquid is accurately measured and transferred. Advantageously, the adaptor in a preferred form cooperates with the adaptor for transferring hazardous chemical liquids from the container to the transfer apparatus for spill-free transfer.

Preferably the thread engaging components are spaced apart in the direction away from the cap portion so that they can engage with circumferentially spaced portions of the same thread form. It is also preferred that the thread engaging components or at least a portion of each of them be flexible towards and away from the cap portion whereby they are self-adjusting to accommodate threads of slightly different pitch, for example, they may be constructed of a low durometer material. It is also preferred that the thread engaging components be so made and arranged that the area of contact with the threads of the threaded opening increases as they are adjusted to suit openings of greater diameter so that they can bear a greater tightening force.

Preferably the cap portion has an integrally formed upstanding wall on the opposite side to the thread engaging components, which has formed therein a socket or has fitted therein an adaptor with a socket formed therein, the socket in either case having an entry adapted to receive therethrough the spigot portion(or other liquid entry part) of liquid transfer apparatus as previously described.

In another aspect this invention resides broadly in an adaptor for fitting to an aperture provided in a wall of a storage tank for receiving the spigot portion of liquid transfer apparatus as previously described, the adaptor including:

a socket portion having an elongate passage extending therethrough with an entry at one end adapted to receive therethrough the spigot portion of the liquid transfer apparatus for sealing engagement in the passage, and an outlet at the other end for allowing liquid to flow out of said socket portion into the storage tank to which the adaptor is fitted;

deflector means depending from said socket portion and extending across the passage for deflecting liquid sideways of said passage;

closure means for selectively closing said entry;

a flange extending outwardly from said socket portion intermediate said entry and said outlet and an external thread on a portion of said socket portion between said flange and said outlet, and a nut adapted for threaded engagement with said threaded portion, the parts being so made and arranged that the threaded portion may be passed through the aperture in the storage tank wall and the flange engaged against one face thereof while the nut engages against the other face to secure the adaptor to the storage tank wall. Preferably, the socket portion has an external thread on the other side of the flange for receiving thereon a threaded cap for closing the entry.

In another aspect this invention resides broadly in the combination of liquid transfer apparatus as previously described for transferring liquid from one container to another container and an adaptor as previously described for adapting an opening of the one container for cooperation with the liquid transfer apparatus.

In another aspect this invention resides broadly in a carry case for a liquid transfer apparatus as herein described including:

a first part and a second part connected to said first part for pivoting movement from an open position in which the liquid transfer apparatus can be placed in and removed from one of said first and second parts and a closed position in which the liquid transfer apparatus is enclosed within said first and second parts, one or both of said first and second parts having a recess adapted to receive the end portion of the body having the liquid inlet to the elongate storage chamber, said recess being adapted to cooperate with the end portion to hold the apparatus in an upright attitude. In a preferred form in which the end portion of the body is conical in shape, the recess is formed in a corresponding conical shape adapted to receive the end portion and hold the apparatus upright.

BRIEF DESCRIPTION OF THE DRAWINGS

In order that the invention may be more readily understood and put into practical effect, reference will now be made to the accompanying drawings which illustrate preferred embodiments of the invention and wherein:

FIG. 1a is a plan view of liquid transfer apparatus according to the invention;

FIG. 1b is a sectional elevation of the apparatus of FIG. 1 along line 1A—1A;

FIG. 1c is a plan view of the body of the apparatus of FIG. 1a;

FIG. 1d is a sectional elevation of the body of the apparatus of FIG. 1a along the line 1A—1A shown in FIG. 1c;

FIG. 1e is a sectional plan view of the body of the apparatus of FIG. 1a along line 1B—1B shown in FIG. 1d;

FIG. 1f is a sectional plan view of the body of the apparatus of FIG. 1a along line 1C—1C shown in FIG. 1d;

FIG. 1g is a sectional plan view of the body of the apparatus of FIG. 1a along the line 1D—1D shown in FIG. 1d;

FIG. 1h is a sectional plan view of part of the body of FIG. 1c showing the joint between the two moulded halves;

FIG. 1i is an enlarged view of DETAIL A of FIG. 1b;

FIG. 2a is a plan view of a pump chamber liner of the apparatus of FIG. 1a;

FIG. 2b is an elevation of the liner of FIG. 2a;

FIG. 3a is a plan view of the upper pump chamber cap of the apparatus of FIG. 1a;

FIG. 3b is a sectional elevation of the upper pump chamber cap of FIG. 3a;

FIG. 4a is a plan view of the lower pump chamber cap of the apparatus of FIG. 1a;

FIG. 4b is a sectional elevation of the lower pump chamber cap of FIG. 4a;

FIG. 5a is a plan view of a thread insert for the cap of FIG. 3a;

FIG. 5b is an elevation of the thread insert of FIG. 5a;

FIG. 6a is a plan view of a bucket component for the pump assembly of the apparatus of FIG. 1a;

FIG. 6b is an elevation of the bucket component of FIG. 6a;

FIG. 7a is a plan view of the plunger rod of the apparatus of FIG. 1a;

FIG. 7b is an elevation of the plunger rod of FIG. 7a;

FIG. 8a is a plan view of the trigger of the apparatus of FIG. 1a;

FIG. 8b is an elevation of the trigger of FIG. 8a;

FIG. 9a is an end elevation of the plunger rod of the pump assembly of the apparatus of FIG. 1a;

FIG. 9b is an elevation of the plunger rod of FIG. 9a;

FIG. 10a is a plan view of an adaptor according to the invention for use with the apparatus of FIG. 1a;

FIG. 10b is a sectional elevation of the adaptor of FIG. 10a along a diametral plane;

FIG. 11a is a bottom view of an adaptor body for use with the apparatus of FIG. 1a;

FIG. 11b is an elevation of the adaptor body of FIG. 1a;

FIG. 11c is an end elevation of the adaptor body of FIG. 11a;

FIG. 13a is a plan view of a carry case with the apparatus of FIG. 1a superimposed to show its position therein;

FIG. 13b is a side elevation of the carry case of FIG. 13a;

FIG. 13c is an end view of the carry case of FIG. 13a showing the apparatus superimposed therein;

FIG. 19b is a sectional elevation of the adaptor of FIG. 19a along line 19a—19a;

FIG. 21 is a pictorial representation of the thread engaging component of the adaptor of FIG. 19a;

FIG. 24a is an enlarged view of DETAIL B of FIG. 24;

DETAILED DESCRIPTION OF THE DRAWINGS

Figure 11A:
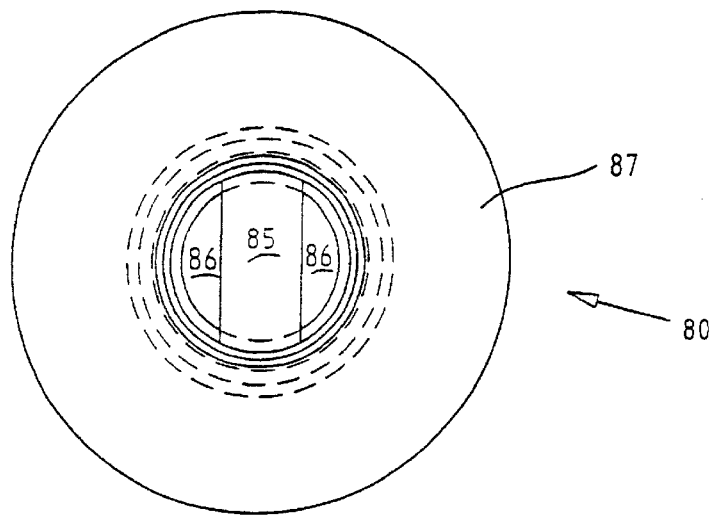
Figures 11B, 11C:
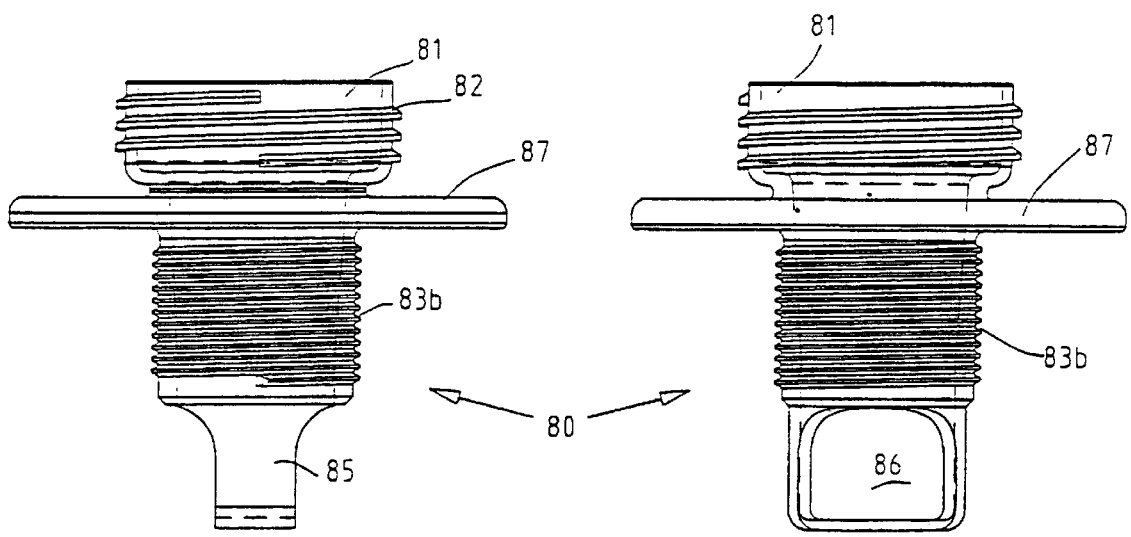
Figure 11D:
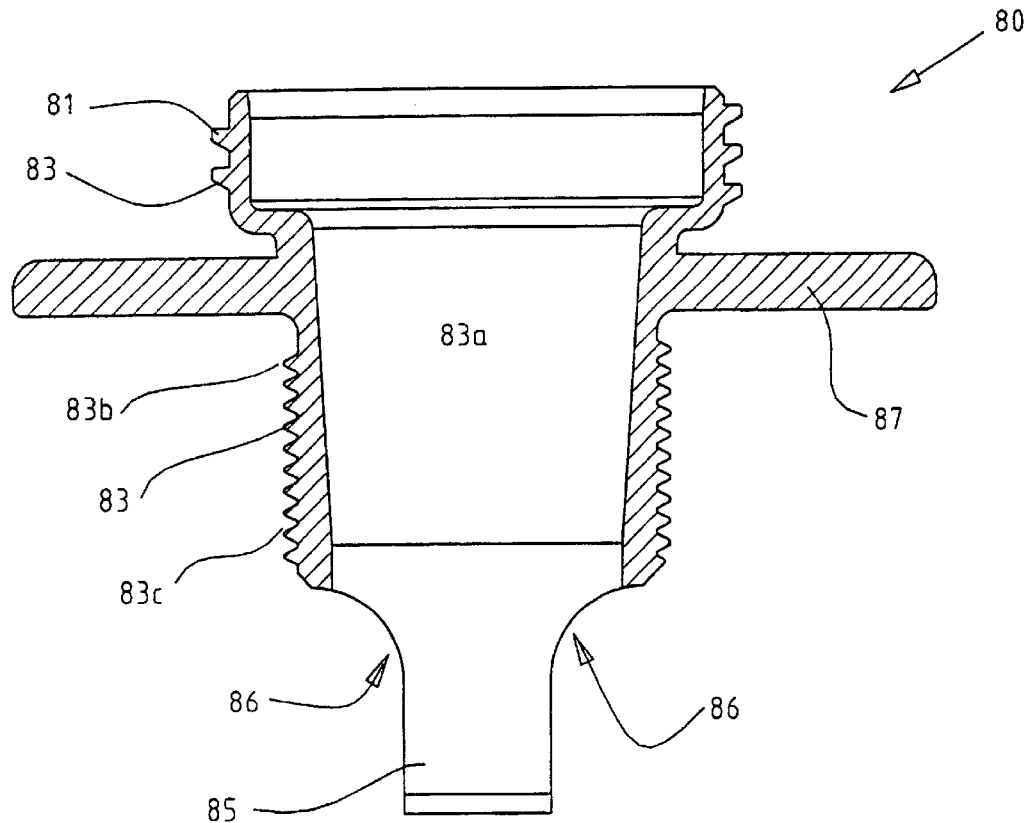
FIG. 11d shows a sectional view of the adaptor body of FIG. 11a with a washer, a nut and a cap shown in-line for assembly with the adaptor body.

The liquid transfer apparatus 10 illustrated in FIGS. 1a and 1b includes a body 11 formed by joining two halves 11a and 11b along a seam line coincident with the section line 1A—1A. Each half is constructed of a thermoplastics material and is formed by an injection moulding process and the two halves are subsequently joined along the seam line in known manner to form the body.

The body defines an elongate liquid storage chamber 12 having a liquid inlet 13 in a spigot portion 14 and a fluid outlet 16 spaced longitudinally from the liquid inlet, a pump chamber 17 adjacent the elongate storage chamber having a fluid inlet 18, a fluid outlet 19, and a handle 21 above the liquid storage chamber with a flow passage 22 therethrough and connected to the fluid outlet 16 and the fluid inlet 18.

Figure 12:
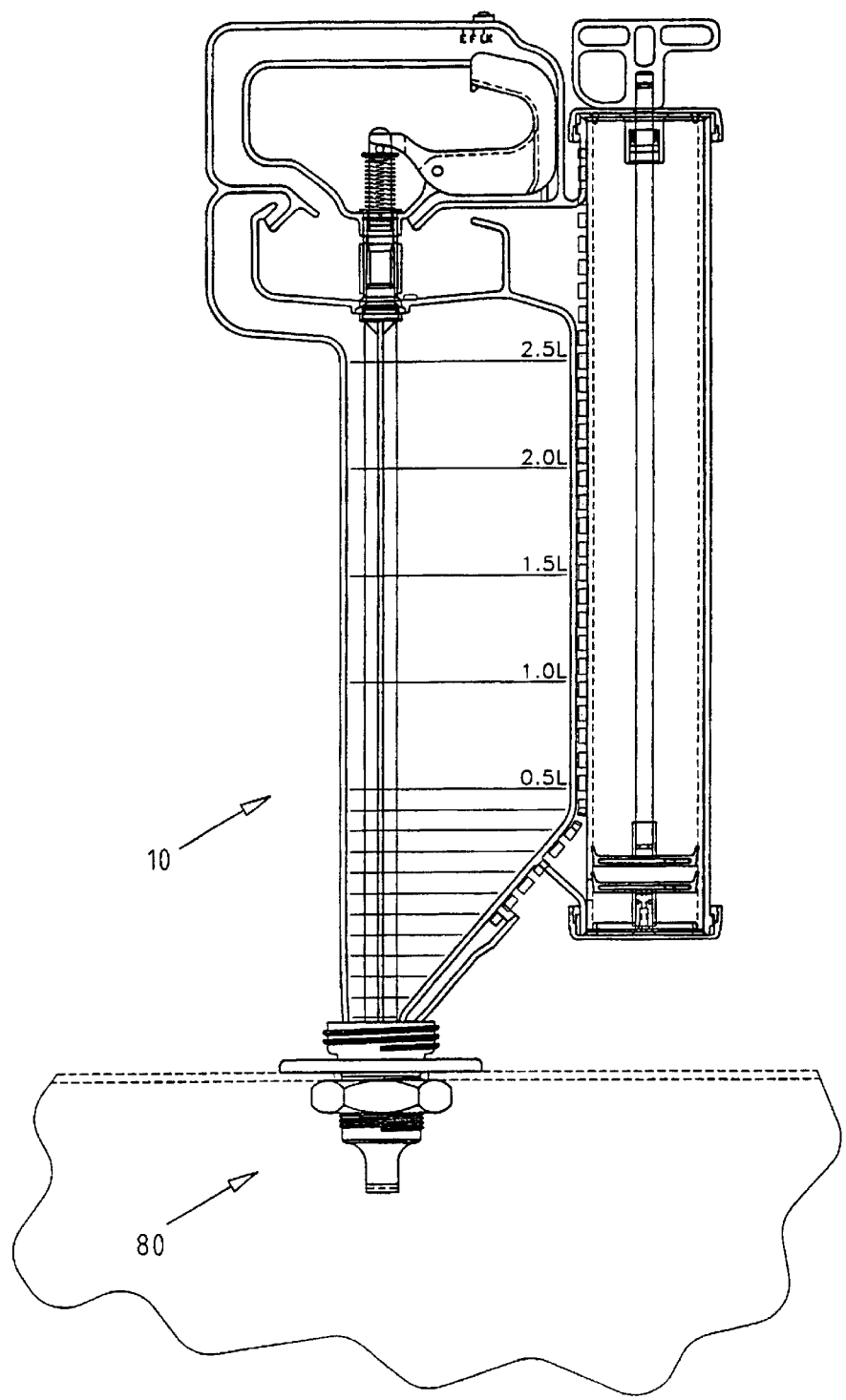
FIG. 12 is a representation of the adaptor of FIG. 11d fitted to a spray tank with the transfer apparatus of FIG. 1a engaged therewith.
Figure 14:
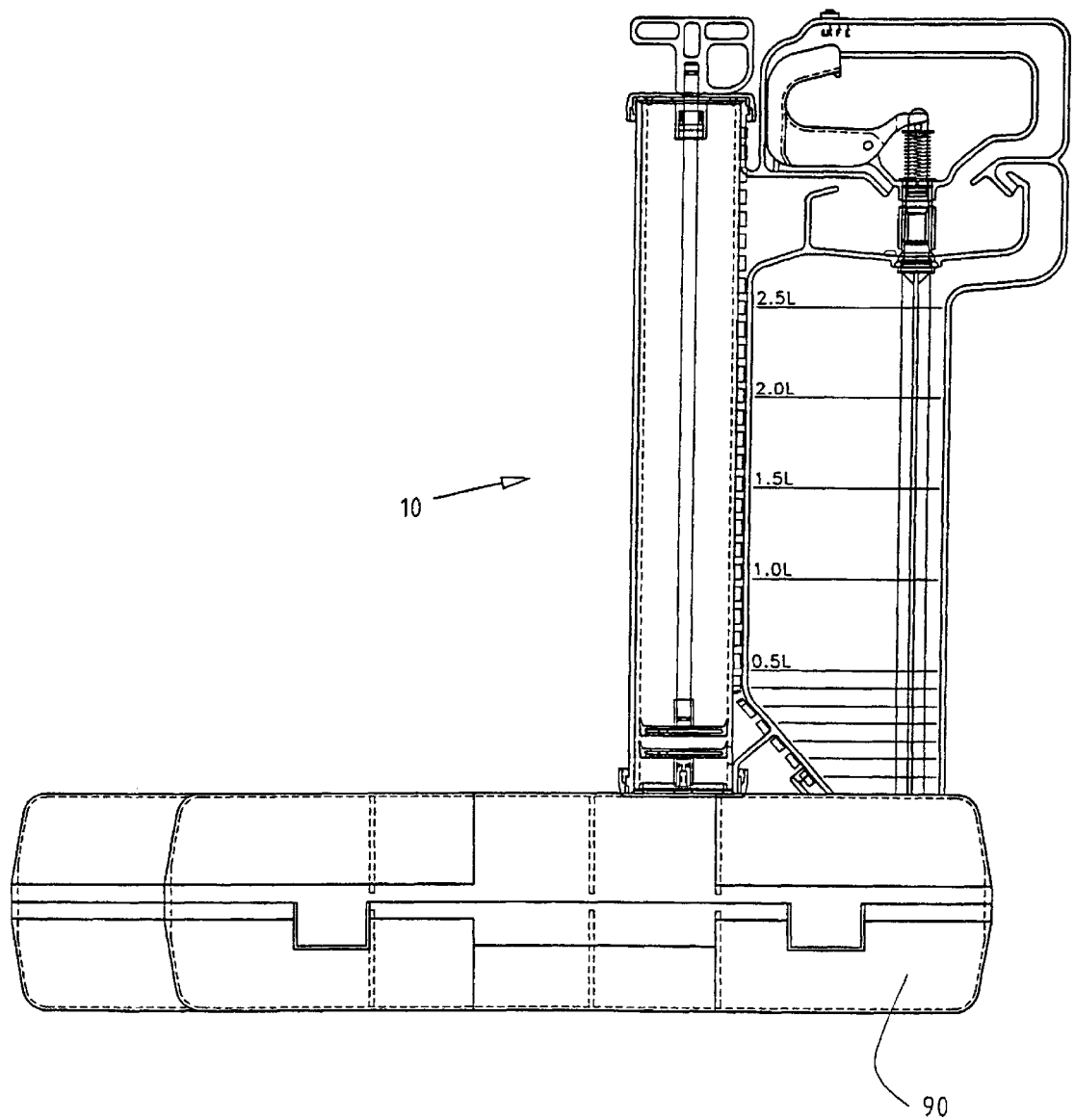
FIG. 14 is an elevation of the carry case of FIG. 13a and the apparatus of FIG. 1a engaged therewith using the carry case as a stand.
Figure 15:
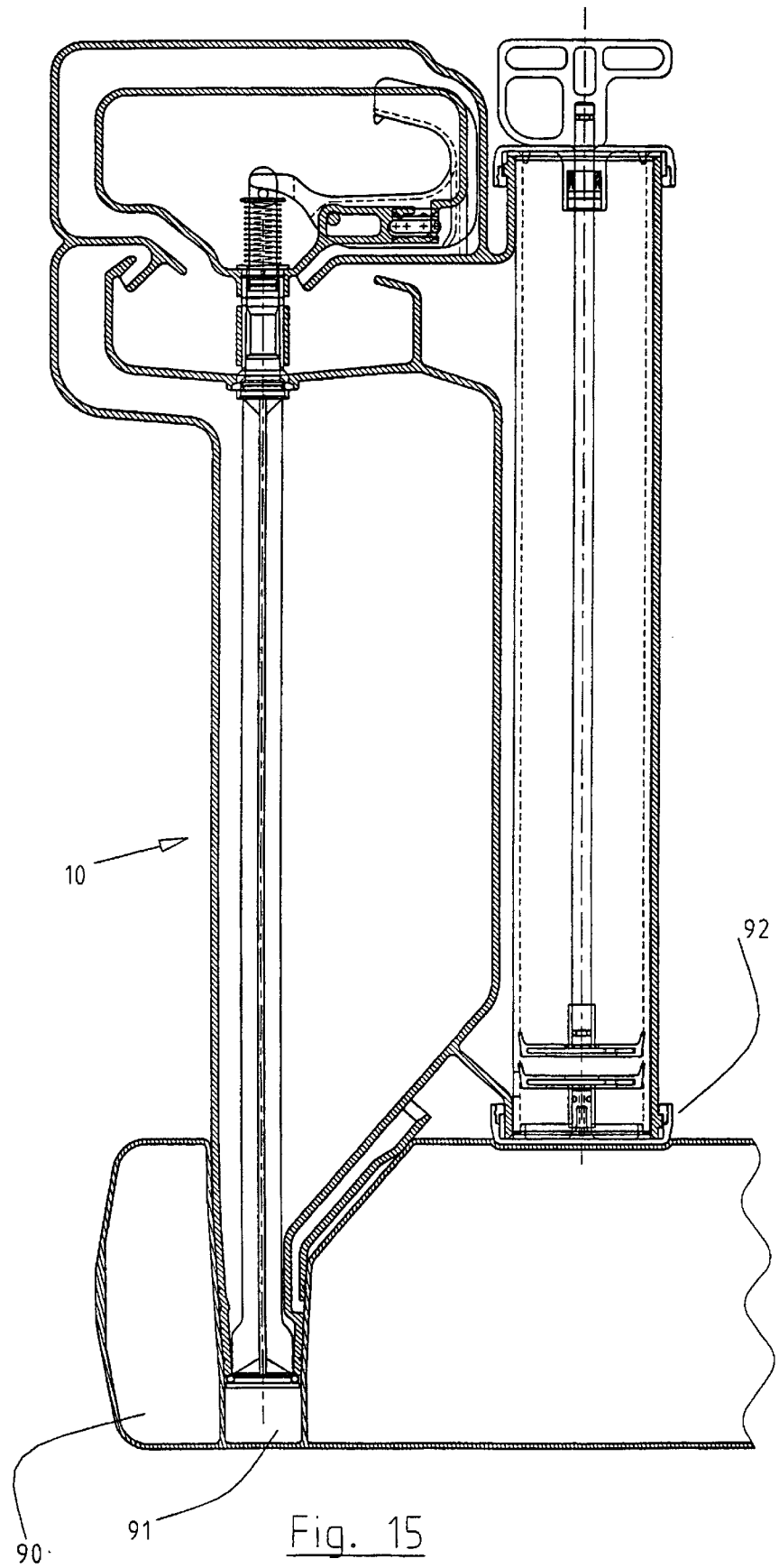
FIG. 15 is a sectional elevation of part of the arrangement shown in FIG. 14.
Figure 24:
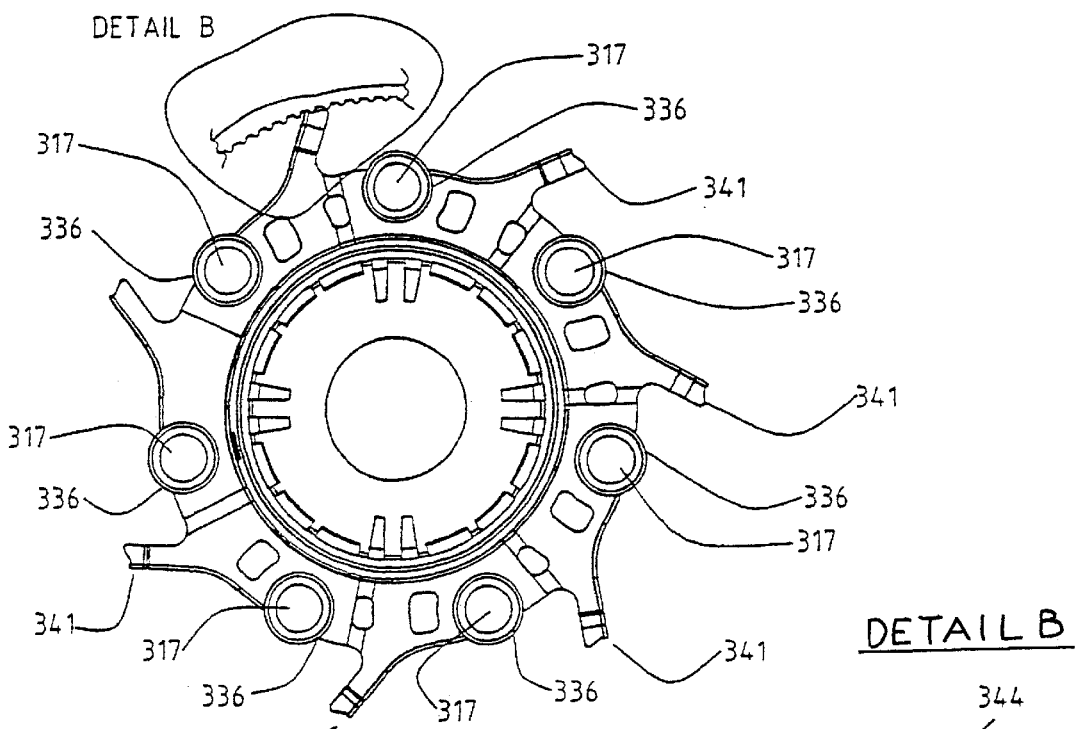
FIG. 24 is a plan view of the cap part of the adaptor of FIG. 22.
Figure 24:
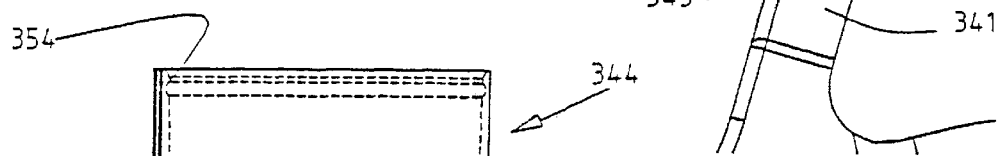
Figure 25:
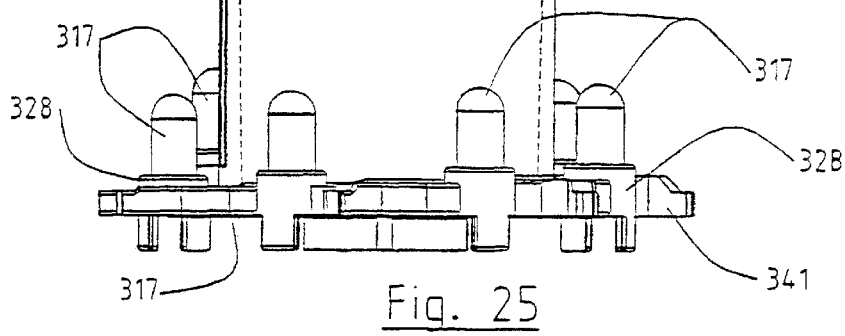
FIG. 25 is an elevation of the cap part of FIG. 24.
Figures 26, 27:
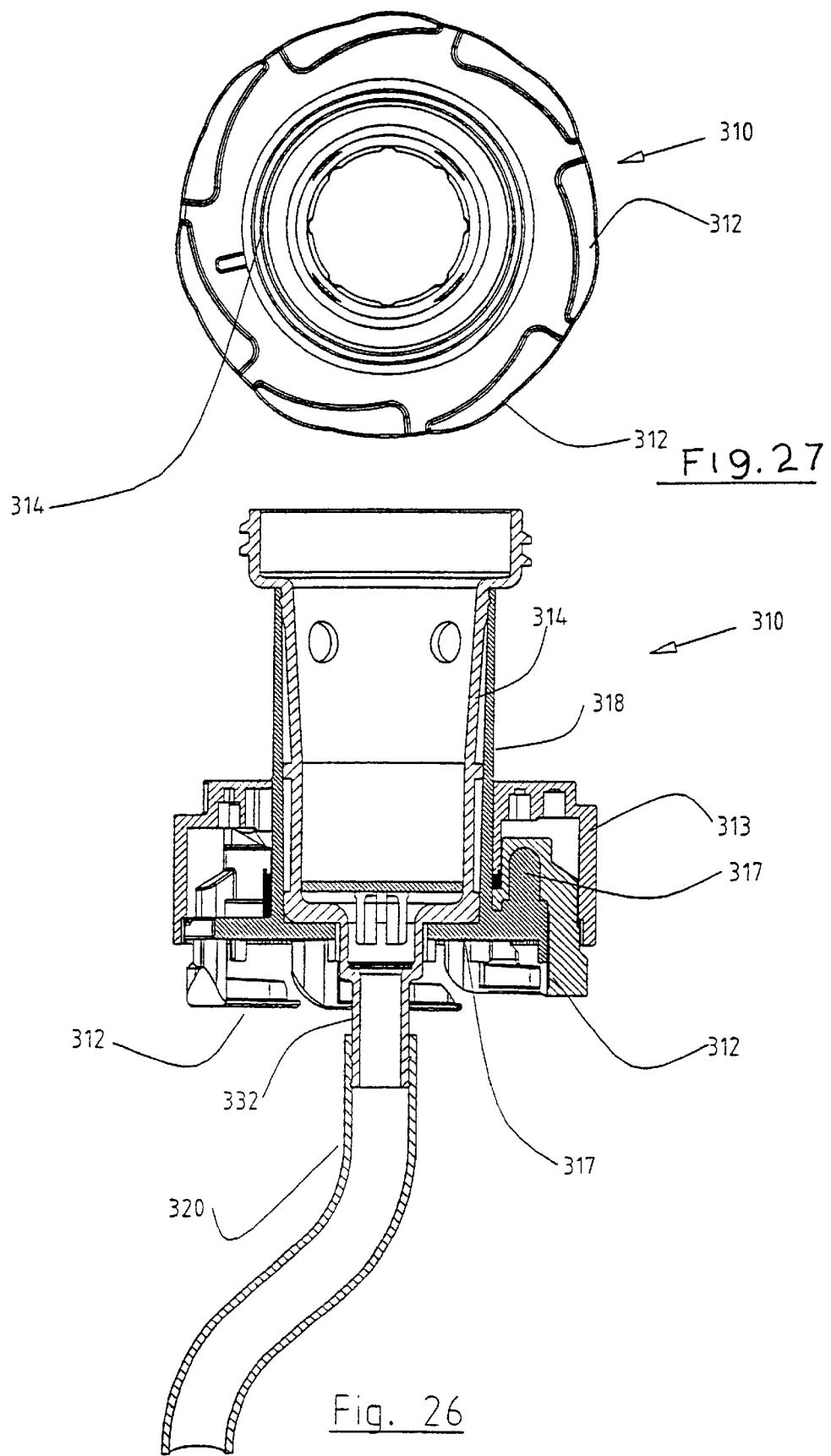
FIG. 26 is a sectional elevation of the adaptor of FIG. 22 along a diametral plane.
FIG. 27 is a plan view of the adaptor of FIG. 22 projected from FIG. 26.
Figure 28A:
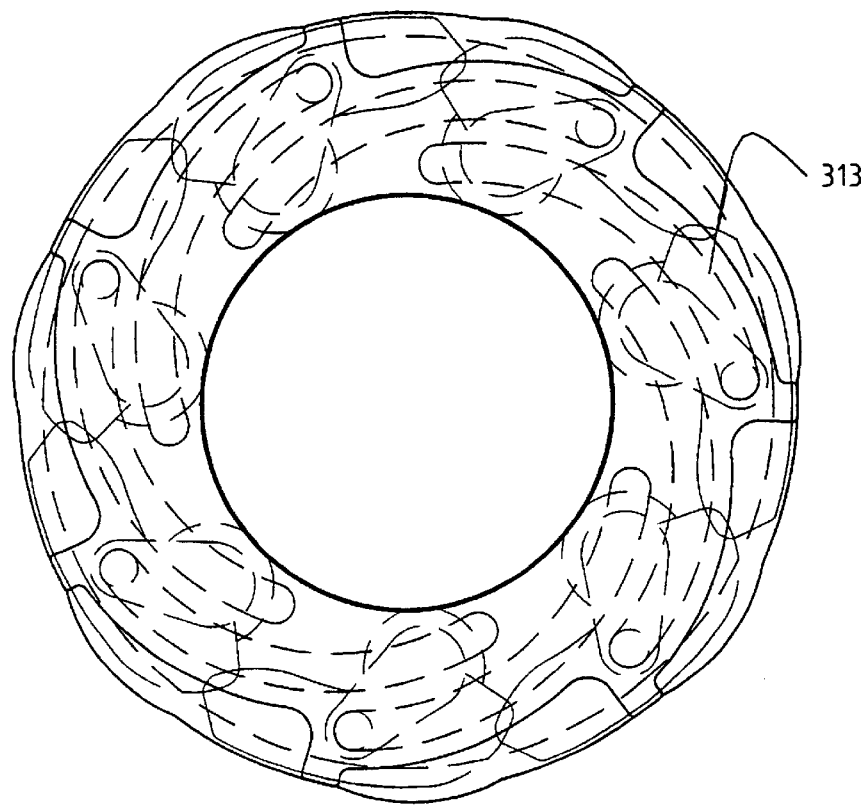
FIG. 28a is a part plan view of the adaptor of FIG. 22 showing some of the components in hidden detail.
Figure 28B:
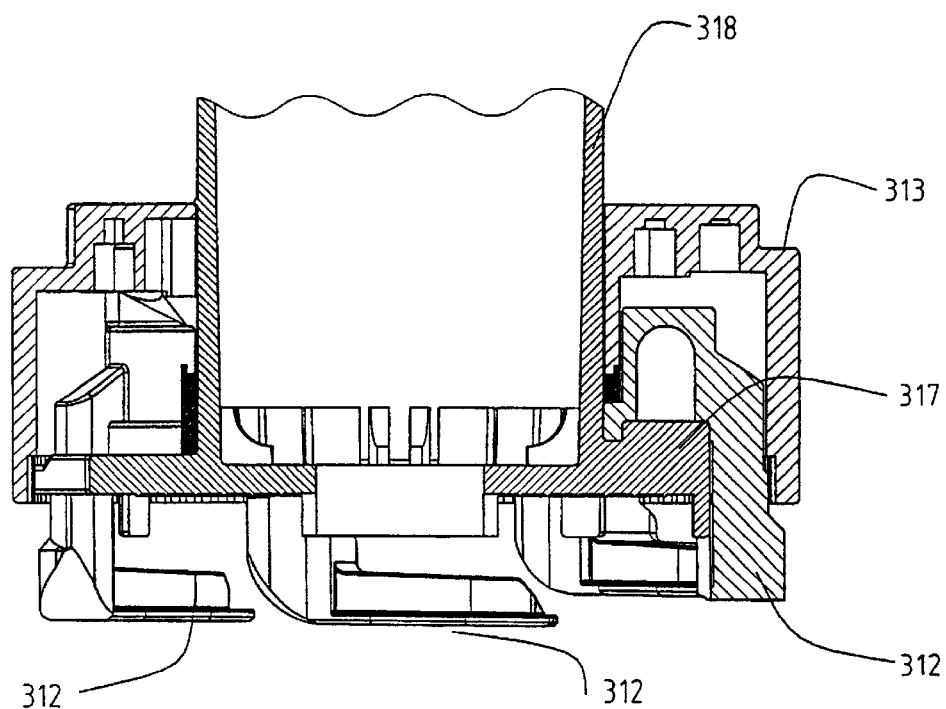
FIG. 28b is a part sectional elevation of an adaptor of FIG. 22 along a diametral plane with the socket body part of the adaptor removed for clarity.
Figure 29:
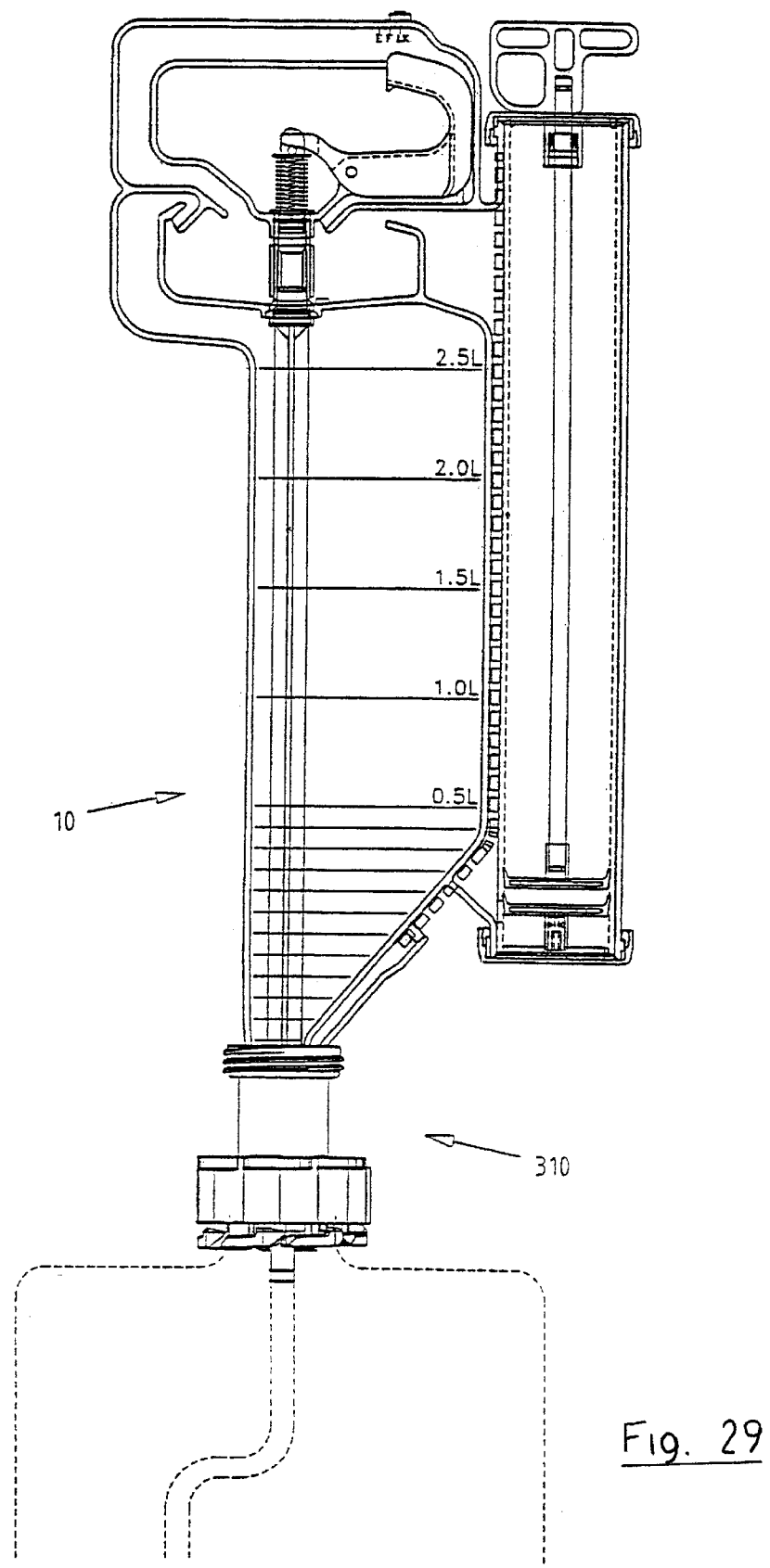
FIG. 29 is an elevation of the liquid transfer apparatus of FIG. 1a in use fitted to the adaptor of FIG. 22.

The lower end portion of the liquid storage chamber is conical in form (an eccentric cone) and has measuring marks or graduations molded on the body (as shown in FIG. 12) so that the amount of liquid stored therein can be easily determined. As more clearly shown in FIG. 1e the pump chamber 17 is substantially circular in cross section but has an elongate recess 20 extending from the fluid inlet 18 almost to the lower end 17b of the pump chamber to provide a flow passage for air sucked from the liquid storage chamber as will be described later. A top cap 24a and a bottom cap 24b are screwed to the upper and lower ends of the pump chamber and can be easily removed to allow the pump assembly (which will be described later) to be removed for cleaning and maintenance purposes. Each cap is moulded in two parts, the thread being formed on one part 24c which is then glued to a second part 24d in the case of the top cap as shown in FIGS. 3a and 3b and 24e in the case of the bottom cap as shown in FIGS. 4a and 4b.

A pump assembly 24 is mounted in the pump chamber and arranged to suck air from the liquid storage chamber via the fluid flow passage 22 thereby creating a vacuum in the liquid storage chamber whereby liquid may flow thereinto via the inlet 13 from a container of liquid in which the inlet is immersed or connected. A valve assembly 26 is arranged to open and close the inlet 13 upon operation of a trigger mechanism 27 as will be described later.

Two liquid collection chambers (sometimes called bubble extraction chambers) 28 and 29 are provided in the fluid passage 22, one being near the fluid outlet 16 of the storage chamber and one being near the inlet to the pump chamber 18. The liquid collection chambers are arranged so that in the upright in-use position as shown in FIG. 1b, undesirable liquid entrained in the air flowing through the flow passage 22 will settle in the liquid collection chambers. Advantageously this prevents the ingress of hazardous chemical into the pump chamber or the pump assembly.

The pump assembly 24 has a pump cylinder 33 constructed of a plastics material and a plunger assembly 34 slidably mounted therein to form a push-pull type plunger pump. The plunger assembly includes a plunger rod 36 and a pump bucket and valve assembly 37 mounted on its lower end. At the other end a handle is secured to the plunger rod externally of the pump cylinder for moving the plunger rod up and down in the normal manner. The pump cylinder has a plurality of apertures 38 provided near its lower end as more clearly shown in FIG. 2b and is a neat fit in the pump chamber 17, the pump cylinder and the recess 20 together defining a flow passage from the fluid inlet 18 to the apertures 38 whereby air may flow from the liquid storage chamber 12 into the pump cylinder via the valve assembly 39 which is secured to the bottom cap 24b.

A fluid outlet 41 is provided in the top cap and is arranged to receive a plastic tube (shown in phantom)whereby air or air and liquid mixture discharged from the pump chamber can flow via the tube to a return passage 42 formed in the body adjacent the lower end of the storage chamber to the container from which liquid is being drawn. The passage 42 terminates at the spigot portion 14 as will be described later.

The valve assembly 26 includes a valve rod 46 which extends longitudinally through the storage chamber from the trigger 27 (which is mounted in a cavity 47 formed by the handle 21) to a valve head 48 having a rubber O-ring 48a at the inlet 13. The trigger is arranged to move the valve rod down and up as the trigger is pulled and released to move the valve head into and out of engagement with the spigot portion 14 to close and open the inlet 13, and is biased to the up position in which the valve head closes the inlet by a spring 50. A second valve head 49 is provided on the valve stem for opening and closing a pair of liquid return passages 51 and 52 between the liquid collection chambers 28 and 29 and the liquid storage chamber 12. Upon the valve stem reaching a predetermined open position the valve head is clear of the passage thereby allowing the return of liquid collected in the collection chambers to the liquid storage chamber. A third valve head 56 is provided on the valve stem near the trigger and is arranged to open and close a passage 57 connecting the collection chambers 51 and 52 to the open hand cavity 47 so that vacuum in the liquid storage chamber can be released to atmosphere. The trigger includes a pin and slot mechanism 66 in which the pin is slidably mounted in the slot and can be selectively engaged with the shoulder of the body for holding the valve stem in the down position thereby preventing deformation of the ring 48a while not in use.

The spigot portion 14 tapers away from the liquid storage chamber to the inlet 13 and has two spaced apart O-ring grooves 61 and 62 provided in the outer face thereof for receiving O-rings 61a and 62a (not shown). The return passage 42 opens into a recess 65 via an opening 63 located between the two O-ring grooves, the recess extending around the spigot portion to distribute returning fluid thereabout so that it can return to the container as will become clearer later. The spigot is shaped and sized for engagement with the adaptor 70 illustrated in FIGS. 12a and 12b as will now be described and other adaptors also described later.

The adaptor 70 illustrated in FIGS. 10a and 10b is adapted for mounting to two different sized standard chemical container openings and includes an upper portion 71 having a screw thread 72 formed on an outer face thereof for screw-threadedly receiving a closure (not shown). A socket portion 73 depends from the upper portion and has an inner face 73a and an outer face 73b while a liquid inlet portion 74 is provided at its lower end 75. A tube 76 is connected to the inlet portion 74 and is adapted to extend to the bottom of a container to which the adaptor is fitted. A plurality of apertures 77 are provided in the socket portion 73 to allow flow of liquid from the socket portion back into the container. The socket portion is shaped to receive therein the spigot 14 of the apparatus 10 with the O-rings 61a and 62a engaging against the inner face 73a of the socket portion above and below the apertures 77 respectively so that the outlet 63 can communicate with the apertures 77 in isolation from the inlet 13. A threaded skirt 78 depends from the upper portion 71 and is adapted to screw threadedly engage with a standard sized container outlet but in another embodiment an additional threaded skirt is provided outside skirt 78 and concentric therewith to suit a larger threaded container opening.

It will be seen the combination of the liquid transfer apparatus 10 and the adaptor 70 such that the spigot portion 14 is sealingly engaged in the socket portion allows liquid to be drawn from a container into the liquid storage chamber 12 by operation of the pump assembly and air pumped from the liquid storage chamber by the pump assembly 24 can be discharged through passages 41 and 42 and into the container thereby forming a closed system.

In use, the closure of a standard 20 litre drum (or other size as desired) is removed and the adaptor 70 is screwed to the container opening with the tube 76 extending to the bottom of the drum. The liquid transfer apparatus 10 is then held with the spigot 14 engaged in the socket portion 73 with the O-rings engaging with the inner face 73a to form a seal. The pump plunger 36 is then moved up and down in the normal manner so as to create a vacuum in the liquid storage chamber 12 whereupon the trigger 27 can be pulled to open the valve head 48 thereby allowing liquid to flow from the drum into the spigot portion 73 and then through the inlet 13 into the liquid storage chamber 12. The liquid storage chamber has measuring graduations or marks (as shown in FIG. 12) provided on the wall so that an operator can accurately measure the amount of liquid drawn into it. Upon the required amount of liquid being drawn into the liquid storage chamber, the trigger is released and the apparatus is removed from the adaptor and transferred to the applicator (or other container) in which the liquid is to be discharged. Once in the desired position the trigger 27 is pulled again to move the valve 48 out of the inlet 13 whereupon the liquid in the storage chamber is released and flows out through the inlet 13. Further pulling of the trigger causes the valve head 49 to open the passage between liquid collection chambers 51 and 52 and the liquid storage chamber 12 so that any liquid collected therein can flow into the liquid storage chamber. Coincidentally the valve head 56 moves downwardly to allow the collection chambers to vent to atmosphere through passage 57.

The adaptor 80 illustrated in FIGS. 11a to 11d is adapted for mounting to a container such as a broom spray tank into which liquid chemical is to be discharged by liquid transfer apparatus such as that shown in FIGS. 1a and 1b. The adaptor is similar in form to adaptor 70 illustrated in FIGS. 10a and 10b and reference can be made to the description relating to that adaptor for a clearer understanding of its construction, although it should be noted that this adaptor is for discharge purposes from the transfer apparatus. The adaptor includes an upper portion 81 having a screw thread 82 formed on an outer face thereof for screw-threadedly receiving the closure 83 shown in FIG. 1d in the same manner as adaptor 70. A socket portion 83 depends from the upper portion and has an inner face 83a and an outer face 83b with a thread 83c formed thereon. A bridge portion 85 depends from the socket portion to create opposed side openings 86 through which liquid can enter the spray tank to which the adaptor is fitted.

The socket portion is shaped to receive therein the spigot 14 of the apparatus 10 but in this case a good seal is not required as the apparatus will not be used in its suction mode. It will be seen that once the spigot portion is fitted in the socket portion the trigger 27 can be pulled to open the inlet 13 so that liquid in the storage chamber 12 can be released into the socket portion of the adaptor and then flow into the spray tank via the side openings 86. it will be appreciated that the bridge portion 85 acts to deflect liquid sideways to spread the liquid (in the case of a chemical) across the surface of the water in the spray tank.

A flange 87 extends outwardly from the outer face of the socket portion and is adapted to abut the outer face of the spray tank (or other container) and a washer 88 and nut 89 are adapted to be fitted to the thread 83c from the inside of the spray tank so that the wall of the spray tank is effectively clamped between the washer and the flange as shown in FIG. 12.

The liquid transfer apparatus can be stowed for easy portability in the carry case 90 illustrated in FIGS. 13, 14, 15 and 16. The carry case includes a recess 91 provided therein having a complementary shape to the lower end portion of the elongate storage chamber to provide a stand for the liquid transfer apparatus when not in use. A smaller recess 92 is provided in the carry case to support the lower end cap of the pump chamber when in the standing position.

Figure 16:
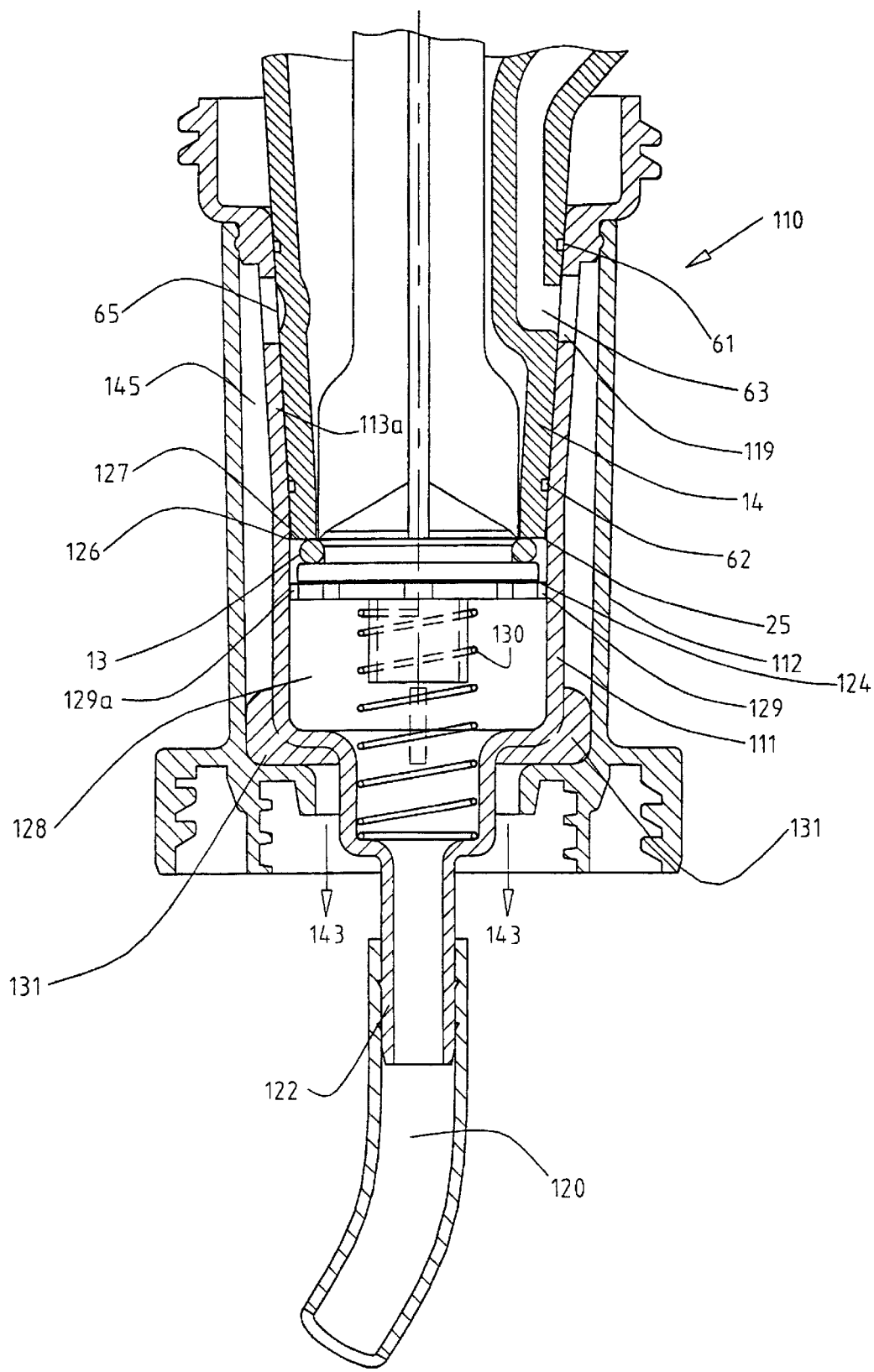
FIG. 16 is a sectional elevation along a diametral plane of another adaptor according to the invention showing part of the inlet spigot of transfer apparatus similar to that of FIG. 1 a but with a larger spigot portion engaged therewith.
Figure 17:
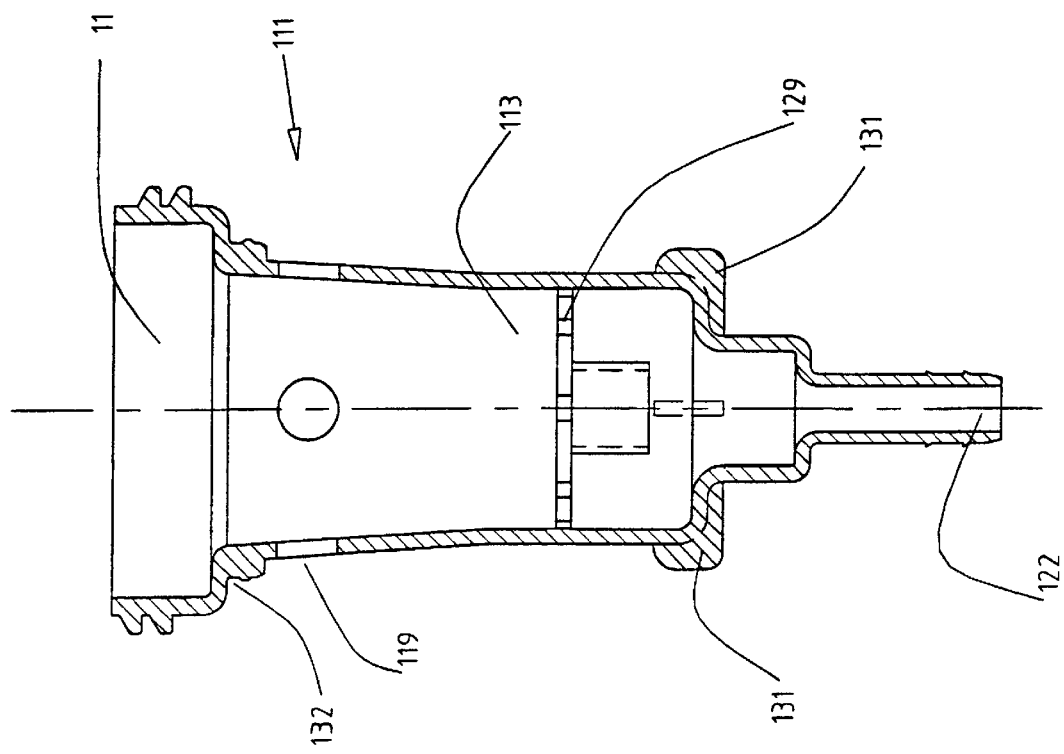
FIGS. 17 and 18 show the same sectional views of the two main components of the adaptor of FIG. 16 prior to assembly.
Figure 18:
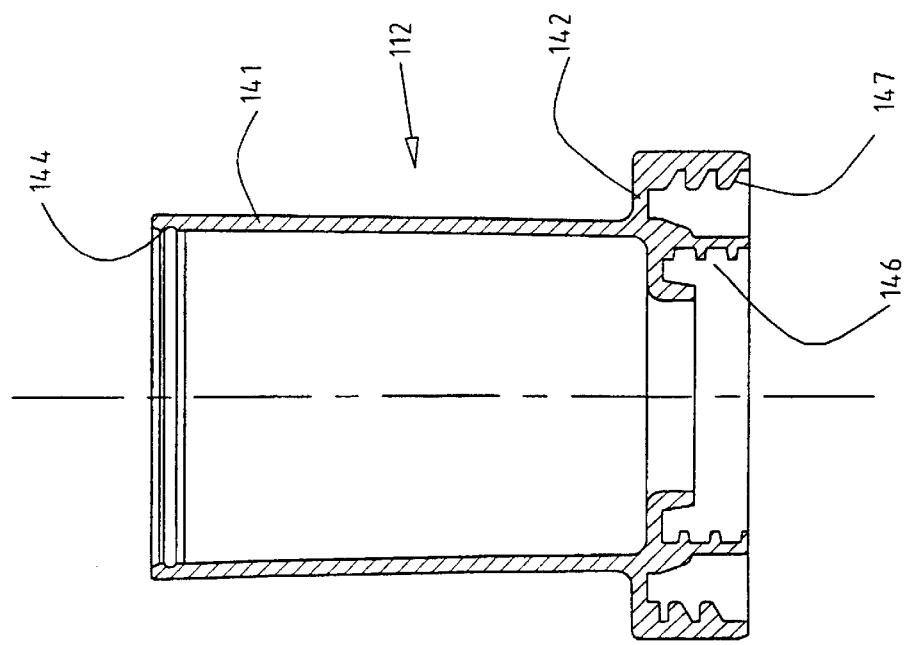

The adaptor 110 illustrated in FIG. 16 includes two main components 111 and 112 illustrated in FIGS. 17 and 18 which are moulded from a plastics material and are both substantially cylindrical in form. The first component 111 has a socket portion 113 adapted to receive therein the spigot portion 14 of liquid transfer apparatus similar to that shown as item 10 in FIGS. 1a, except that the spigot portion has a greater diameter, which is adapted to suck liquid from the socket portion for transfer to another container, for example, the storage chamber of a boom spray and the same reference numerals will be used when referring to the larger transfer apparatus as for apparatus 10. It will be seen that the spigot has two circumferentially extending O-ring grooves 61 and 62 in which O-rings (not shown) are mounted for sealing engagement with the inner face 113*a* of the socket portion. It will also be seen that the pump spigot has a return fluid outlet 63 which is aligned with the fluid return outlet 119 provided in the wall of the socket portion. A plurality of such outlets are spaced around the wall to allow increased return fluid flow and a circumferential recess 65 is formed in the pump spigot to provide a flow path for returning fluid from the outlet 18 to any of the outlets 119 as previously described.

At its lower end, the first component has a liquid inlet 122 to which a tube 120 (which corresponds to tube 76 in FIG. 10*b*) is connected and which is a suitable length for reaching the bottom of the container to which the adaptor is to be fitted. The tube and the inlet are adapted to allow free flow of liquid from the container into the socket portion 113 from where it can flow into the pump via the pump liquid inlet 13. The pump inlet is selectively closed by the valve head 48 which engages with the bottom end 25 of the spigot portion and is operated by a trigger 27 on the pump handle for downward movement against a spring bias (also in the handle) to move the bottom cap to the open position to allow liquid to enter the pump via opening 23. In this case the rubber ring 48*a* is replaced by an O-ring 48*b* for sealing as previously described.

A plunger assembly 128 is mounted in the lower end of the first component 111 and includes a plunger head 129 which is mounted on a spring 130 for up and down movement in the socket portion. Spaced apart lugs 129*a* are provided on the periphery of the plunger head thereby forming flow passages between the plunger head and the inner face of the socket portion. In use, the valve head 48 of the pump spigot 14 engages against the upper face of the plunger head as the spigot is being inserted into the socket portion and the spring 130 holds it in place so that liquid being drawn into the pump through the inlet 13 via the socket portion does not come into contact with the bottom face of the plunger 124.

The second component 112 has an upper sleeve portion 141 and a lower securing portion 142 and as more clearly illustrated in FIG. 16, when the first component is mounted within the second component an annular space 145 is formed between the socket portion and the sleeve portion with the fluid outlet 119 opening into this annular space and the annular space thereby providing a fluid flow passage for flow of return fluid to the container along the flow path marked as item 143. The first component has a bead 32 extending about the outer face of the socket portion near its upper end which engages in a complementary groove 144 formed about the inner face of the sleeve portion near its upper end to secure the two main components together. At its lower end, the inner component has four spaced apart lugs 131 thereon which engage with the inner face of the sleeve portion 141 to centralise the first component therein. It will be appreciated that the two components can be easily die-moulded and fitted together to form a simple adaptor unit which can be screwed to an external thread of a container outlet. For this purpose two alternative threads 146 and 147 are provided on the securing portion 142. Thread 146 is formed to engage a standard size thread of a four litre container and it will be seen that the diameter of the entry 115 is greater than the inner diameter of the standard container opening to which the adaptor can be fitted with thread 146. Thread 147 is adapted to engage with the standard size external thread of a twenty litre container.

The adaptor 110 may be fitted to the container outlet of a standard four litre container by screwing the thread 146 onto the complementary thread of the container whereupon the pump spigot 14 can be engaged in the socket 113 as shown and the underside face of the bottom cap then engages the upper face of the plunger head. The valve head 48 can then be pushed downwardly to open the inlet 13 with the valve head being forced against the upper face of the plunger head. The pump can then be operated to suck liquid out of the container through the inlet tube 120 and the liquid inlet 122 so that liquid flows into the socket portion around the lugs 129*a* and then into the pump through the inlet 13. As the pump is operated, air, vapour or other fluid being forced from the collection chamber in the pump can flow through the pump return fluid outlet 63 and the fluid outlet 119 into the annular space 145 and then into the container via the flow path 143 in a similar manner to that described earlier in relation to adaptor 70.

It will be seen that the diameter of the socket portion 13 is such as to receive a pump with a bigger spigot 14 than would be possible with adaptor 70. Advantageously a greater diameter spigot portion allows a faster flow rate for liquid into the pump.

The adaptor 210 illustrated in FIGS. 19*a* to 21 includes a cap part 211 from which seven thread engaging components 212 depend and which are spaced circumferentially about a cap axis 215, a cover 213 which is operatively connected to the thread engaging components for adjusting their respective positions, and a socket body 214 which is secured to the cap part and extends through a centrally located aperture 216 provided therein for communication with liquid in the container to which the adaptor is to be fitted The cap part has a disk-like cap portion 217 which is adapted on its underface to sealingly engage the rim of an externally threaded container, and a sleeve portion 218 extending upwardly from the upper face of the cap portion to provide a housing for the socket body 214. A sealing ring or washer may be fitted to the underface of the cap portion to effect better sealing with the container rim if desired and in this embodiment an annular recess extends about the aperture 216 for holding a flat sealing washer. Seven apertures 219 are provided in the cap portion 217 equally spaced about the cap axis near its periphery and the thread engaging components are pivotally mounted to the respective apertures as will be described in more detail later.

Each thread engaging component 212 includes a lobe 221 which has an arcuate edge face 222 with a bevelled lower portion 222*a* adapted to engage in a thread recess or under a thread form. The lobe is mounted on one end of a small shaft or stem 223 and a crank 224 is mounted on the other end of the shaft with a crank pin 226 extending from the crank arm. The stem of the respective thread engaging components extends through its respective aperture 219 so that the lobe 221 is below the cap portion and the crank arm 224 and crank pin 226 are above the cap portion. It will be appreciated that orbiting of the crank pin 226 about the shaft axis 225 will be effective to move the edge 222 of the lobe towards and away from the axis 215 for engagement of the respective thread engaging components with the threads of container openings of different sizes. In another embodiment, the bevelled lower portion 222*a* is replaced by a plurality of laterally extending flexible fingers 227 (not shown) which are adapted to self mould around the thread form of the container opening.

Orbiting of the respective crank pins about their respective shaft axes 225 is controlled by the cover 213 which is rotatably mounted on the sleeve 218 resting on a sleeve like washer 220 and being retained on the sleeve by an integrally formed bead 218a. The cover has seven curved slots 225 which slidably receive therein the crank pins of the respective thread engaging components and it will be seen that partial rotation of the cover about the axis 15 causes orbiting of the crank pins about their respective stem axes 225. Also in this embodiment the components are arranged to be secured at a selected thread engaging position by a securing mechanism(not shown) but similar to that described later in relation to FIGS. 22 to 28b.

The respective thread engaging components are spaced from the cap portion 217 by different amounts in a helical or stair like manner in order to approximate a thread form and to be able to engage with the external thread of the container to which the adaptor is to be fitted. The different spacing is effected by the inclusion of different thickness washers 228 on the respective shafts 223 between the cap portion and the lobe with complementary spacer washers being fitted on the shaft between the upper face of the cap portion and the crank arm 224. Thus there are seven sets of different thickness washers 228 and 229 with each set having the same aggregate thickness. In this embodiment, the lobes 221 are constructed of a low durometer plastics material and can self-mould to accommodate variations in container thread pitch and thread-form shape. The lobes are also flexible to a limited extent and can self adjust to suit different pitches.

The socket body 214 has an upper socket portion 251 adapted to receive therein the spigot portion 14 of the pump 10 of FIG. 1a, and a tail portion 252 which extends through the aperture 216 in the cap part and provides a fluid flow path from the container to which the adaptor is fitted, to the pump. A bead 253 extends about the outer face of the socket body near its upper end and engages in a complementary groove 254 formed about the sleeve 18 near its upper end for securing the socket body in the sleeve in much the same manner as the adaptor of FIG. 16.

In use, an operator would remove the closure from a container of hazardous liquid in order to extract liquid therefrom and fit the adaptor 210, for example, of the present invention. In order to do so, the operator would partially rotate the cover 213 in an anti-clockwise direction (from above) to force the lobes 221 to their outermost position or at least a position in which the lobes can fit around the container opening and once fitted, the cover can be partially rotated in the clockwise direction to force the edge portions 222 of the lobes into engagement with the threads of the container. Once satisfactory engagement has been reached, the locking pin 220 can be moved to the locking position to secure the cover and the thread engaging components at the selected positions. The adaptor can then be screwed further onto the container to ensure that the cap portion seals against the upper rim of the container outlet. Once the adaptor has been set to suit a particular container, it can be screwed on and off the same container or like containers in the normal manner of a screw on closure, but can be reset by applying additional torque to the cover plate to force the securing mechanism to release as will be more clearly understood from the following description of adaptor 310.

Figure 19A:
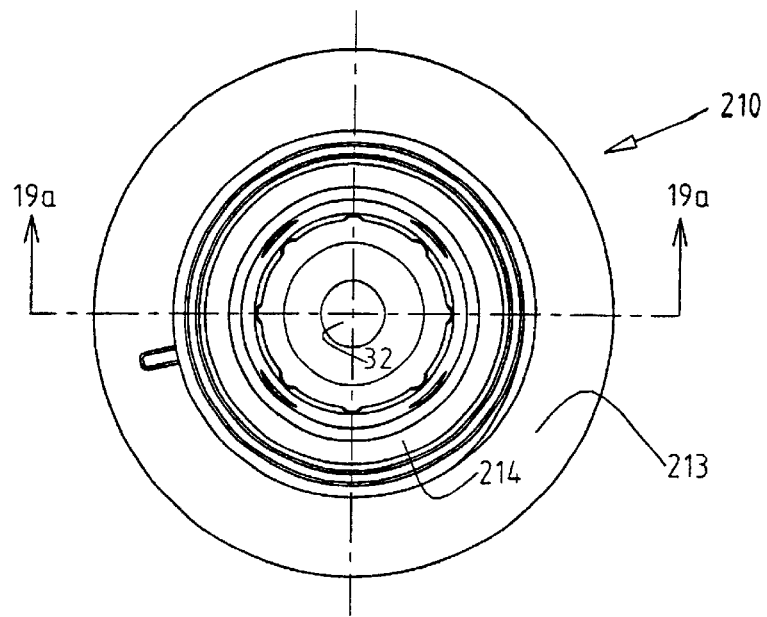
FIG. 19a is a plan view of another adaptor according to the invention without hidden detail.

The adaptor 310 illustrated in FIGS. 22 to 28b operates in a similar manner to that of FIG. 19a. However, in this case the cap part includes a plurality of integrally moulded stems 317 which extend upwards therefrom about the sleeve portion 318 and the thread engaging components 312 have a complementary blind bore 319 therein in order that they are mounted on the respective stems. In other respects each thread engaging component is very similar with lobe 321, crank arm 324 and crank pin 326. A shoulder 328 is provided on each shaft at different spacings from the upper face of the cap portion for the purpose of spacing the thread engaging portions from the cap portion as described in relation to FIG. 19b. Additionally, a lug 341 extends outwardly in a semi-radial direction from each lobe with a protuberance 342 formed on its end face and is adapted to engage with complementary recesses 343 formed in the skirt portion 344a of the cover 344 to secure the thread engaging components in a selected thread engaging position. Also, a locating ring 346 is provided to assist in locating the cover 344 about the sleeve portion. The socket body in this adaptor has a plunger head 329 mounted on a spring 330 in a similar manner to that of adaptor 110 shown in FIG. 16

Figure 19B:
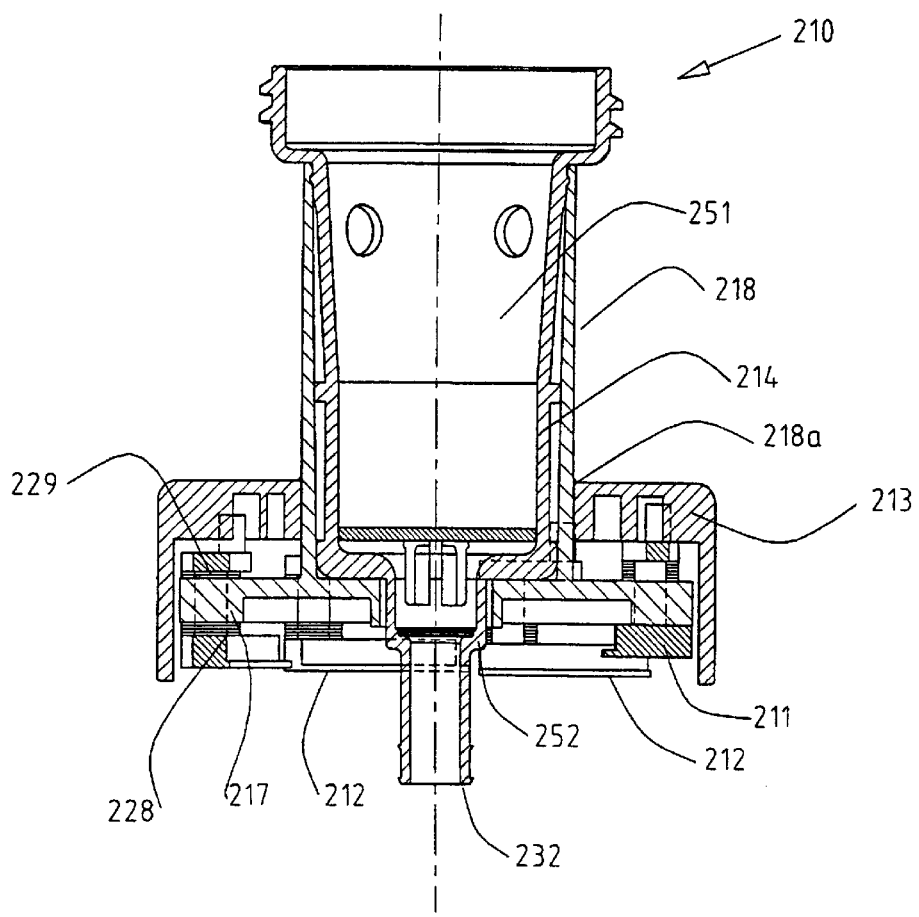
Figure 19D:
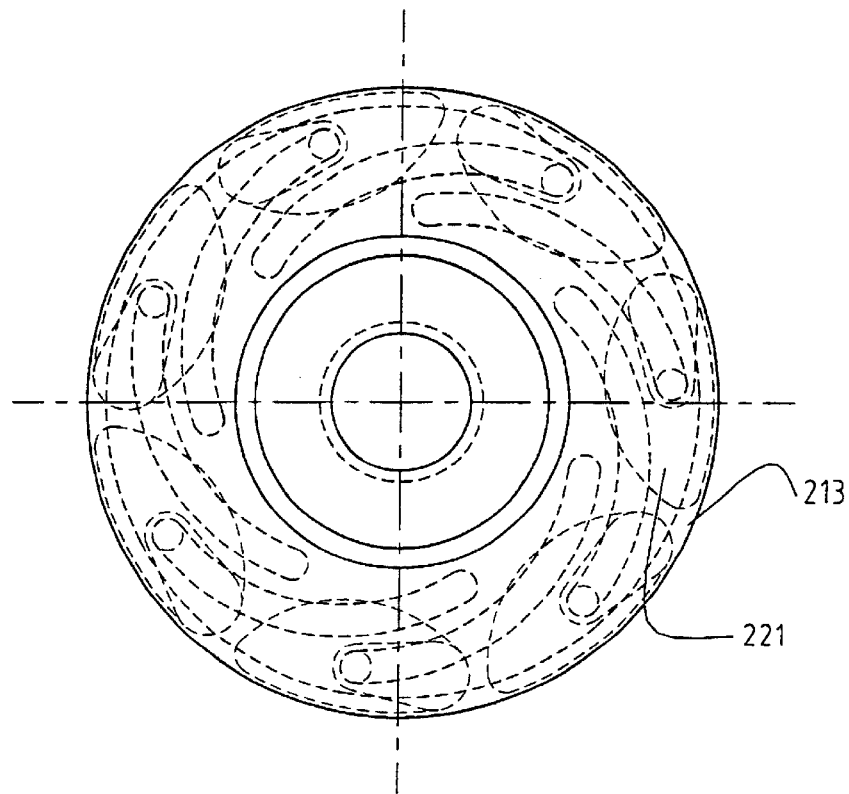
FIG. 19d is a plan view of the adaptor of FIG. 19a having some components in hidden detail.
Figure 19C:
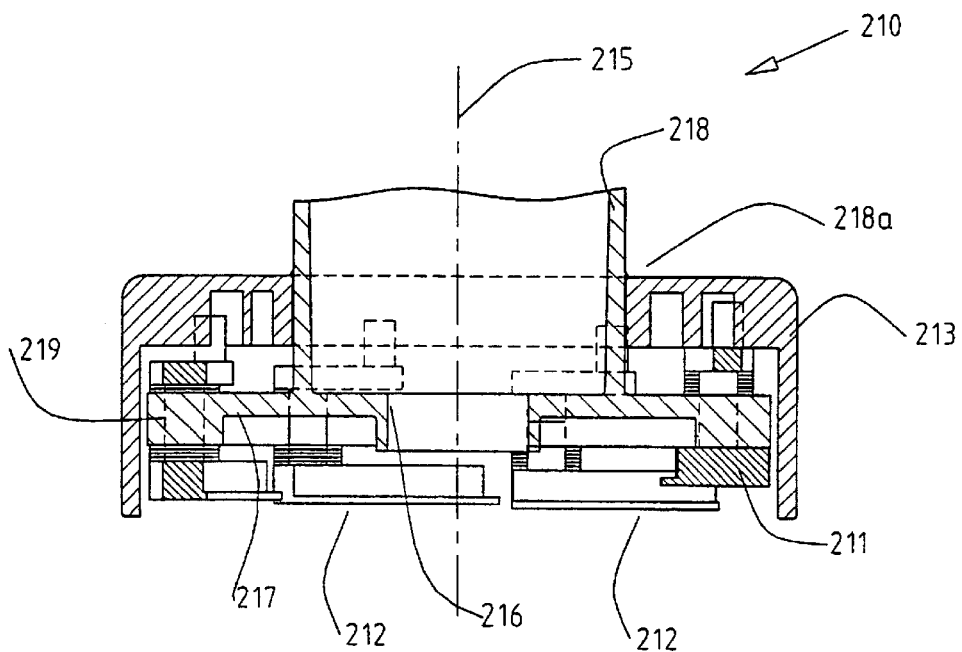
FIG. 19c is the same elevation as in FIG. 19b except that the socket body part of the adaptor has been removed for clarity.
Figure 20A:
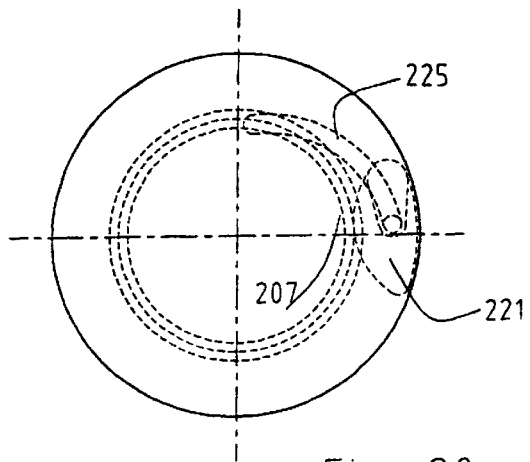
FIGS. 20a, 20b and 20c are part sectional plan views of the adaptor of FIG. 19a illustrating use with different sized container openings with threads 207, 208, and 209 respectively.
Figure 21:
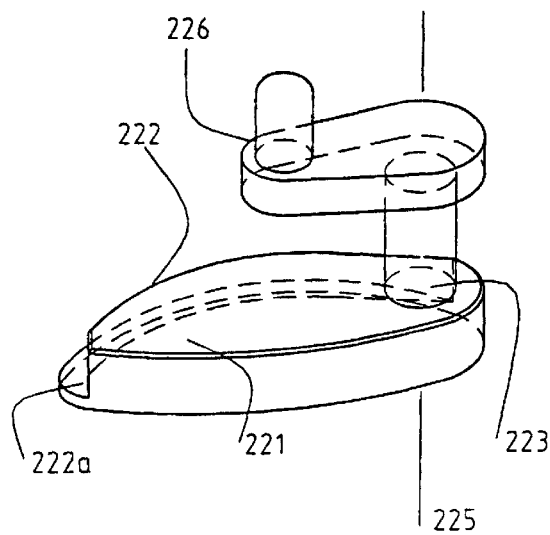
Figure 20B:
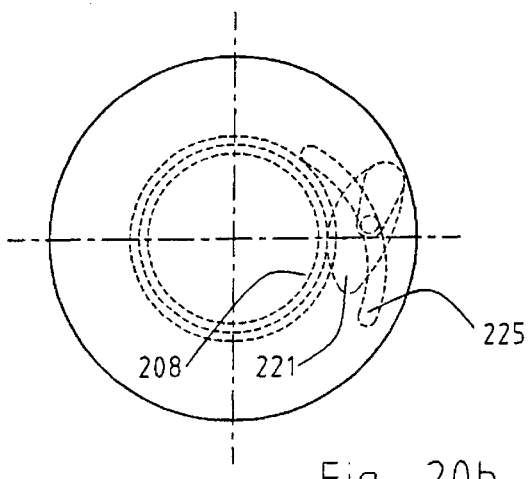
Figure 20C:
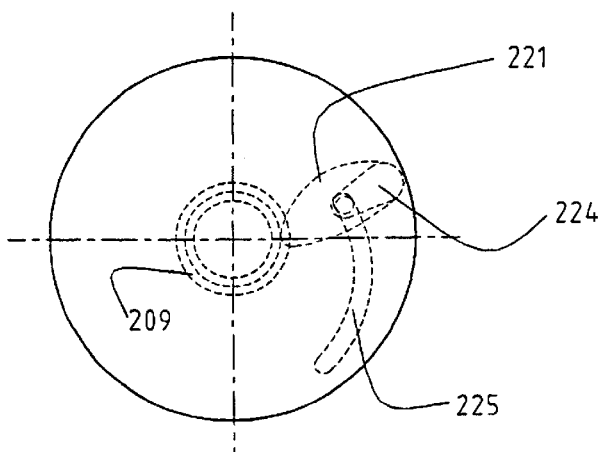
Figure 22:
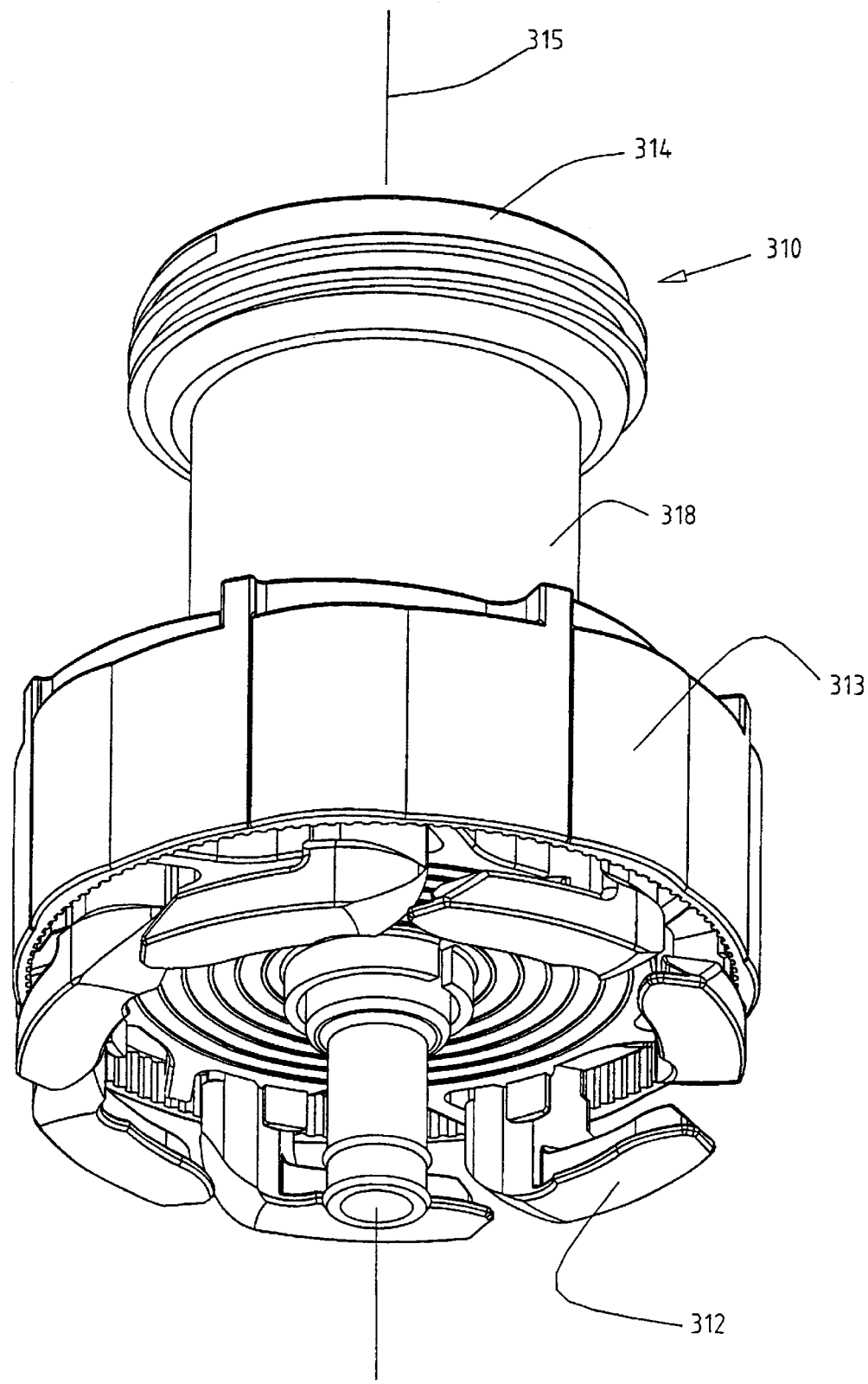
FIG. 22 is a pictorial representation of another adaptor according to the invention fully assembled.
Figure 23:
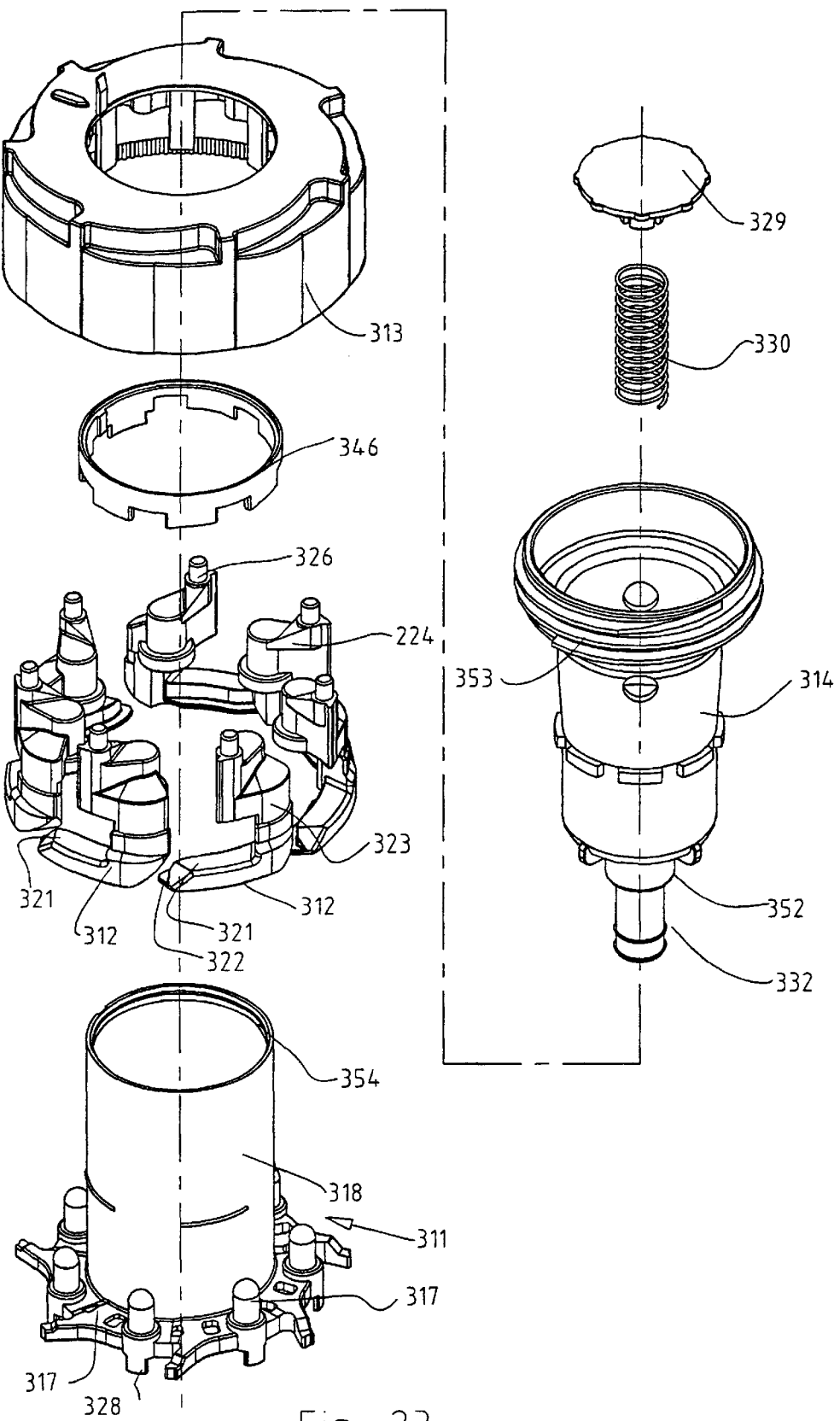
FIG. 23 is a pictorial representation of the adaptor of FIG. 22 with various components in-line for assembly.
Figure 30:
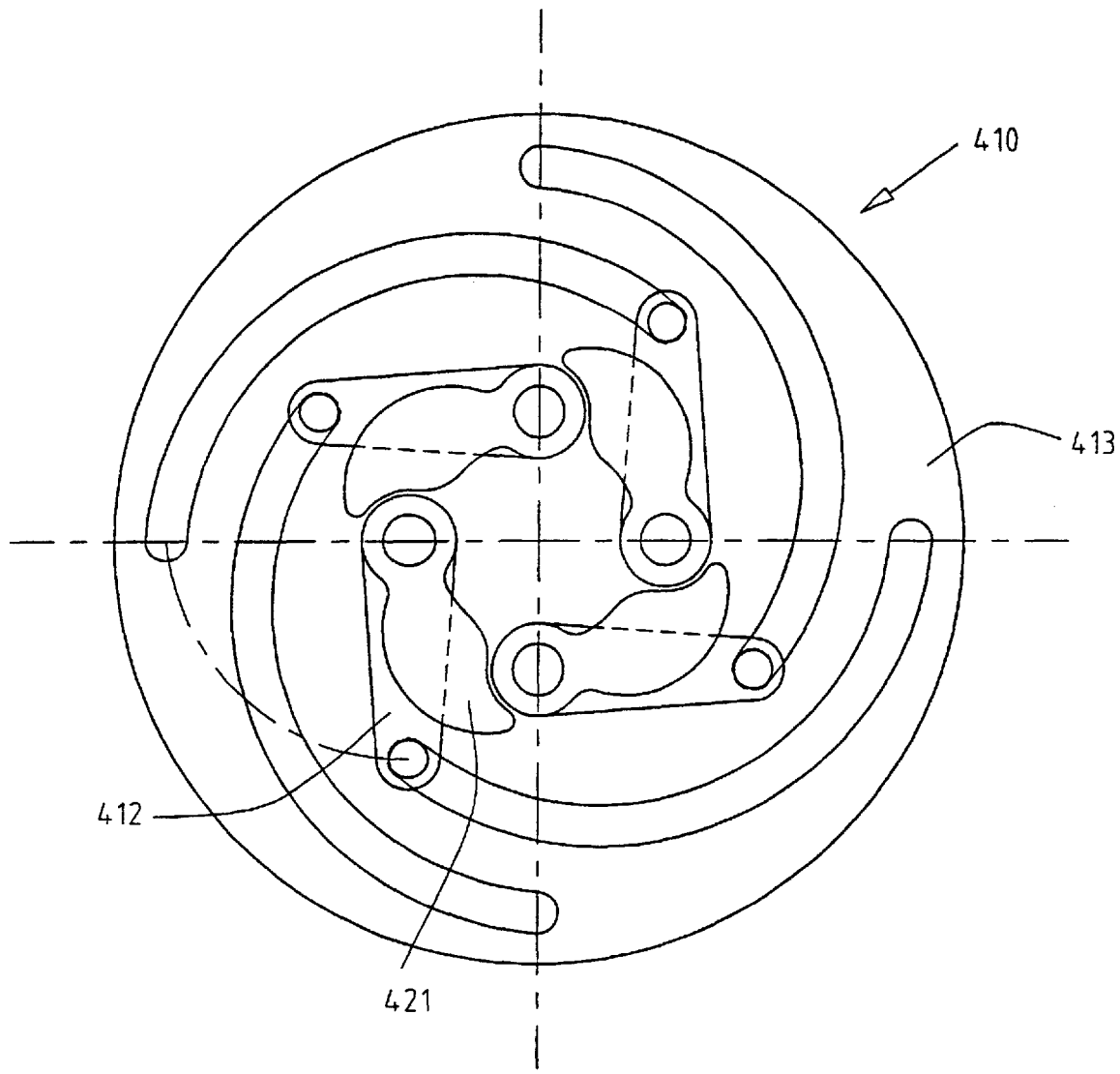
FIG. 30 is a sectional plan view of an alternative adaptor according to the invention for use with an internally threaded opening.

The adaptor 410 shown in FIG. 30 works in a very similar manner to that of FIG. 19b although it is intended for use with a container outlet having an internal thread. For the sake of brevity of description, corresponding components have been referenced by corresponding numbers in FIG. 19b but the first digit is a "4" instead of a "2" and a clear understanding of the method of operation should be gained from the earlier description. In this embodiment, there are only four thread engaging components 412 and the lobes 421 of these components fit within the container opening rather than outside it as in FIG. 19b. Movement of the lobes is controlled by the cover plate 413 in much the same manner as that previously described in relation to cover plate 213 but of course the cover 413 will be partially rotated to cause engagement of the lobes 421 with the internal thread of the opening.

While the foregoing description has been given by way of illustrative example of the invention, all other modifications and variations thereto as would be apparent to persons skilled in the art are deemed to fall within the broad scope and ambit of this invention as is defined in the appended claims.

What is claimed is:

1. Liquid transfer apparatus for transferring liquid from one container to another container including:

a body defining an elongate liquid storage chamber having a liquid inlet at one end and a fluid outlet spaced longitudinally from said liquid inlet, a pump chamber having a fluid inlet and a fluid outlet, a fluid flow passage connecting said elongate liquid storage chamber and said pump chamber via said fluid outlet of said elongate storage chamber and said fluid inlet of said pump chamber, and a handle, said body being formed of two halves joined together, each half defining part of said elongate storage chamber and part of said pump chamber and being constructed substantially of a thermoplastics material;

pump means mounted in said pump chamber for sucking air from said storage chamber via said pump chamber fluid inlet, and valve means for selectively opening and closing said liquid inlet whereby liquid may be allowed to flow into said elongate storage chamber upon suction being applied to said elongate liquid storage chamber by said pump means and opening of said liquid inlet.

2. Liquid transfer apparatus according to claim 1, wherein said handle includes a passage therethrough which forms at least part of said fluid flow passage and each half defines half of said handle and said passage.

3. Liquid transfer apparatus according to claim 2, wherein said fluid flow passage includes one or more liquid collection chambers therein for collecting liquid from moist air flowing therethrough, said one or more liquid collection chambers being arranged so that liquid from moisture laden air flowing through said fluid flow passage may collect therein.

4. Liquid transfer apparatus according to claim 2, wherein said valve is controlled by a trigger mounted adjacent said handle.

5. Liquid transfer apparatus according to claim 1, wherein said fluid flow passage includes one or more liquid collection chamber therein for collecting liquid from moist air flowing therethrough, said one or more liquid collection chambers being arranged so that liquid from moisture laden air flowing through said fluid flow passage may collect therein.

6. Liquid transfer apparatus according to claim 1, wherein said valve is controlled by a trigger mounted adjacent said handle.

7. Liquid transfer apparatus for transferring liquid from one container to another container including:
  a body defining an elongate liquid storage chamber having a liquid inlet at one end in a spigot portion of said body for receiving liquid from the one container and for discharging liquid to the other container, and a fluid outlet spaced longitudinally from said liquid inlet, a pump chamber having a fluid inlet and a fluid outlet, a fluid flow passage connecting said elongate liquid storage chamber and said pump chamber via said fluid outlet of said elongate storage chamber and said fluid inlet of said pump chamber, and a handle, said spigot portion being adapted to sealingly cooperate with a complementary socket provided in the one container;
  suction pump means mounted in said pump chamber for sucking air from said storage chamber via said pump chamber fluid inlet, and
  valve means for selectively opening and closing said liquid inlet whereby liquid may be allowed to flow into said elongate storage chamber upon suction being applied to said elongate liquid storage chamber by said pump means and opening of said liquid inlet.

8. Liquid transfer apparatus according to claim 7, including a conduit connected to said pump chamber fluid outlet and opening adjacent said spigot portion and being adapted to cooperate with the complementary socket provided on the one container to allow fluid to flow into the one container as liquid is removed.

9. In combination, liquid transfer apparatus for transferring liquid from one container to another container and an adaptor for adapting an opening of the one container for cooperation with the liquid transfer apparatus,
  said liquid transfer apparatus including a body defining an elongate liquid storage chamber having a liquid inlet at one end in a spigot portion of said body for receiving liquid from the one container and for discharging liquid to the other container, and a fluid outlet spaced longitudinally from said liquid inlet, a pump chamber having a fluid inlet and a fluid outlet, a fluid flow passage connecting said elongate liquid storage chamber and said pump chamber via said fluid outlet of said elongate storage chamber and said fluid inlet of said pump chamber, and a handle, said spigot portion having two spaced apart sealing means;
  suction pump means mounted in said pump chamber for sucking air from said storage chamber via said pump chamber fluid inlet, and valve means for selectively opening and closing said liquid inlet whereby liquid may be allowed to flow into said elongate storage chamber, and a conduit connected to said pump chamber fluid outlet and said spigot portion and opening between said spaced apart sealing means;
  the adaptor including a socket portion adapted to sealingly receive the spigot portion of the liquid transfer apparatus and to sealingly engage with the two spaced apart sealing means of said spigot portion and having securing means on said socket portion or operatively connected to said socket portion for securing the adaptor to the container, said socket portion having a liquid inlet for allowing liquid to flow into said storage chamber from the one container via said socket portion upon suction being applied to said socket portion via the liquid inlet of the storage chamber, and a fluid outlet for allowing flow of fluid from said socket portion to the one container, said fluid outlet being located in use between said spaced apart sealing means whereby fluid sucked from said elongate storage chamber may flow through said conduit into said socket portion between said spaced apart sealing means and into the one container thereby allowing the apparatus and the container to form a closed system during transfer of liquid from the one container to the storage chamber.

10. In combination, liquid transfer apparatus for transferring liquid from one container to another container including:
  a body defining an elongate liquid storage chamber having a liquid inlet at one end and a fluid outlet spaced longitudinally from said liquid inlet, a pump chamber having a fluid inlet and a fluid outlet, a fluid flow passage connecting said elongate liquid storage chamber and said pump chamber via said fluid outlet of said elongate storage chamber and said fluid inlet of said pump chamber, and a handle, said body being formed of two halves joined together, each half defining part of said elongate storage chamber and part of said pump chamber and being constructed substantially of a thermoplastics material;
  pump means mounted in said pump chamber for sucking air from said storage chamber via said pump chamber fluid inlet, and
  valve means for selectively opening and closing said liquid inlet whereby liquid may be allowed to flow into said elongate storage chamber upon suction being applied to said elongate liquid storage chamber by said pump means and opening of said liquid inlet; and an adaptor for fitting to an opening of a container and adapted to co-operate with a spigot portion of said liquid transfer apparatus for filling the apparatus with liquid from the container, the adaptor including:
  a socket portion having an entry adapted to receive therethrough said spigot portion for sealing engagement of said spigot portion in said socket portion;
  securing means on said socket portion or operatively connected to said socket portion for securing said socket portion to the container for liquid communication of the socket portion with the container via the container opening, and
  a liquid inlet in said socket portion for allowing liquid to flow into said socket portion from the container, the parts being so made and arranged that liquid may flow from said socket portion to the liquid transfer apparatus through said spigot portion upon vacuum being thereto applied, the diameter of said entry being greater than the diameter of the opening of the container.

* * * * *